(12) United States Patent
Hartley et al.

(10) Patent No.: US 9,344,606 B2
(45) Date of Patent: May 17, 2016

(54) SYSTEM AND METHOD FOR COMPILING AND PLAYING A MULTI-CHANNEL VIDEO

(71) Applicant: SRSLY, Inc., San Francisco, CA (US)

(72) Inventors: Christopher Albert Hartley, San Francisco, CA (US); Brett Ronald Welch, San Francisco, CA (US)

(73) Assignee: Radical Switchcam LLC, Dallas, TX (US)

(*) Notice: Subject to any disclaimer, the term of this patent is extended or adjusted under 35 U.S.C. 154(b) by 19 days.

(21) Appl. No.: 13/748,217

(22) Filed: Jan. 23, 2013

(65) Prior Publication Data

US 2013/0188923 A1 Jul. 25, 2013

Related U.S. Application Data

(60) Provisional application No. 61/590,229, filed on Jan. 24, 2012.

(51) Int. Cl.
| | |
|---|---|
| *H04N 9/80* | (2006.01) |
| *H04N 5/04* | (2006.01) |
| *H04N 9/87* | (2006.01) |
| *H04N 5/91* | (2006.01) |
| *H04N 21/43* | (2011.01) |
| *H04N 21/44* | (2011.01) |
| *H04N 21/472* | (2011.01) |
| *H04N 21/482* | (2011.01) |
| *G11B 27/10* | (2006.01) |
| *G11B 27/34* | (2006.01) |
| *H04N 5/765* | (2006.01) |
| *H04N 9/82* | (2006.01) |

(52) U.S. Cl.
CPC .................. *H04N 5/04* (2013.01); *G11B 27/10* (2013.01); *G11B 27/34* (2013.01); *H04N 5/91* (2013.01); *H04N 9/87* (2013.01); *H04N 21/4307* (2013.01); *H04N 21/44008* (2013.01); *H04N 21/44016* (2013.01); *H04N 21/47217* (2013.01); *H04N 21/482* (2013.01); *H04N 5/765* (2013.01); *H04N 9/8205* (2013.01)

(58) Field of Classification Search
CPC .................. H04N 21/4307; H04N 21/44016; H04N 21/47217; H04N 21/482
USPC .................................................. 386/241, 725
See application file for complete search history.

(56) References Cited

U.S. PATENT DOCUMENTS

| | | | | |
|---|---|---|---|---|
| 2007/0292106 | A1* | 12/2007 | Finkelstein et al. | 386/55 |
| 2008/0092168 | A1* | 4/2008 | Logan et al. | 725/44 |
| 2012/0141046 | A1* | 6/2012 | Chen et al. | 382/282 |
| 2012/0224828 | A1* | 9/2012 | Silber et al. | 386/230 |

\* cited by examiner

*Primary Examiner* — Thai Tran
*Assistant Examiner* — Jose Mesa
(74) *Attorney, Agent, or Firm* — Klemchuk LLP; Kirby B. Drake

(57) ABSTRACT

A system and method including retrieving a multi-channel video file with a first video segment and a second video segment; assigning a rank to the first video segment and second video segment; and rendering at least the first and second video segment in a player interface, synchronized to a timeline of the multi-channel video file, and comprising: playing the first video segment in an active stream, progressing a timeline of the multi-channel video file when video is played in the active stream, when the timeline progresses to a synchronized time of the second video segment, playing the second video segment in the active stream and displaying the first video segment as a selectable video channel if the rank of the second video segment is greater than the rank of the first video segment, and otherwise displaying the second video segment as a selectable video channel.

20 Claims, 21 Drawing Sheets

SYSTEM AND METHOD FOR COMPILING AND PLAYING A MULTI-CHANNEL VIDEO

CROSS-REFERENCE TO RELATED APPLICATIONS

This application claims the benefit of U.S. Provisional Application Ser. No. 61/590,229, filed on Jan. 24, 2012, which is incorporated in its entirety by this reference.

TECHNICAL FIELD

This invention relates generally to the video stream field, and more specifically to a system and method for compiling and playing a multi-channel video in the video stream field.

BACKGROUND

Current video-sharing websites and applications, like YouTube and Vimeo, provide users with convenient venues through which to upload, store, and view video content. Though access to individual video segments is relatively straightforward, these services fail to provide convenient mechanisms by which distinct but related video segments may be presented to a user in a continuous video stream. To watch a concert, for example, users must typically choose multiple video segments of the concert. This is required because of the storage limits of video cameras and the upload limits of video-sharing websites. Thus, there is a need in the video stream field to create a new and useful system and method for compiling and playing a multi-channel video. This invention provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
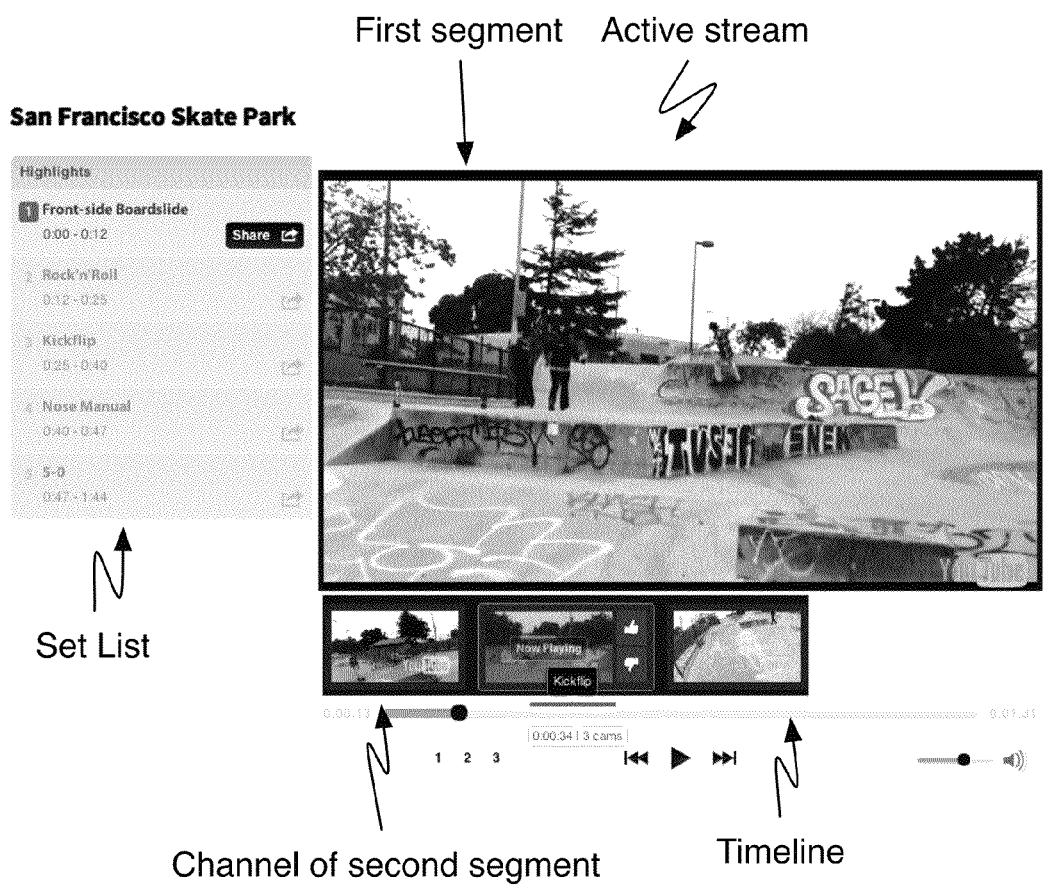
FIG. 1 is a graphical representation of a user interface through which a video stream of the preferred embodiment is presented to a user.

A system and method for compiling and playing a multi-channel video of a preferred embodiment functions to aggregate distinct but related video content, which is based on at least two different sources, into a stream of video content that is continuous over a time duration, as shown in FIG. 1. The video content is preferably divided into video segments that in combination form a playable multi-channel video. A multi-channel video is preferably defined as a video composed of multiple and preferably selectable channels of video segments. Each video segment is preferably related to other video segments of the video stream by way of a real event or portion of a real event captured audibly and/or visually in each video segment. Unless otherwise noted, in this document: a video segment defines a digital media file wholly distinct from a separate second video segment; a channel defines one or more video segments, and, in the variation that includes two or more video segments, the video segments are non-overlapping and are arranged in time with the proceedings of the event; and the terms 'video,' 'video content,' and 'video segment' include combined audio and visual signals, in digital form.

The multiple video segments preferably define at least two sources, wherein at least one video segment of a first source overlaps in time with at least one video segment of the second source. The first source and the second source are meant to include separately identified and accessible video files, even if these files are hosted by the same entity on the same server. The overlap between two video segments may therefore define a bridge ("link") between two distinct video segments and thus provide information by which to align the distinct video segments. Disparate video segments of the same event or portion of an event may thus be assembled into a video stream that is continuous over a time duration longer than any single video segment in the stream. Put another way, the combined duration of the video segments is greater than the duration of the assembled video stream. The video stream may thus include video content captured simultaneously from various vantage points (camera angles) during the event. The multi-channel video of the preferred embodiment may therefore provide substantially more complete coverage of an event than a single video segment, and the video stream may also or alternatively improve the viewing experience of the user by: providing additional points of view (perspectives) of the event over at least a portion of the time duration thereof; and automatically augmenting or completing an incomplete video segment.

The system and method of the preferred embodiment may be used to aggregate distinct video segments, captured by any two or more cameras at any particular event, into a continuous video stream. The event may be any of a music concert, a play, an opera, a sporting event, a lecture, a speech, a protest, a presentation, a demonstration, an accident, a party, a game show, or any other suitable event. Various individuals (i.e., participants), at various locations proximal the event and at various times throughout the event, may capture video segments of all or portions of the event. These participants may use any suitable device to capture such video content, such as a smartphone (e.g., iPhone), a digital camera (e.g., Cannon EOS Rebel), or any other suitable device, and these individuals preferably upload these video segments to any suitable video-sharing website and/or server. Such video-sharing websites and/or servers may include a multi-channel video service, YouTube, Vimeo, Flickr, Picasa, Facebook, and/or Google+, wherein the video segments are preferably stored, indexed, and made accessible to other users or the general public. At any time after multiple video segments of the event become available, a user may initiate generation of the continuous video stream of the event; alternatively, the method may be initiated automatically, such as following a trigger that is a threshold number of related videos with overlapping content. Once the method is complete and the multi-channel video is created, one or more users may access the multi-channel video to view compiled recordings of the event that are substantially more complete and/or provide more information than any single video segment capturing all or a portion of the event.

The preferred embodiments therefore function to string together distinct video segments such that, for a user watching video of a given event, a second video segment automatically or selectively plays in an active video stream to provide continuous footage of the given event. As shown in FIG. 1, the video segments may be strung into channels of time-aligned video segments; upon expiration of a first video segment in a first channel, a second channel is automatically initiated; the video stream of the event may thus continue substantially uninterrupted by automatically switching to a different audio and/or visual feed from a different source. The active video stream may therefore provide a continuous feed of video segments of various camera angles, camera locations, perspectives, audio and/or video qualities, etc. substantially without breaks (from the perspective of the user) or user input between video segments. Furthermore, the user may manually switch between channels and/or video segments (such as with a mouse click on a channel or segment) to substantially control how he experiences recorded media of an event. The video stream of aggregated video content from any number of sources may thus serve to create a more complete and multi-dimensional (e.g., multi-perspective) video stream of the proceedings of an event for viewing by a user.

1. System for Compiling and Playing a Multi-Channel Video

Figure 2:
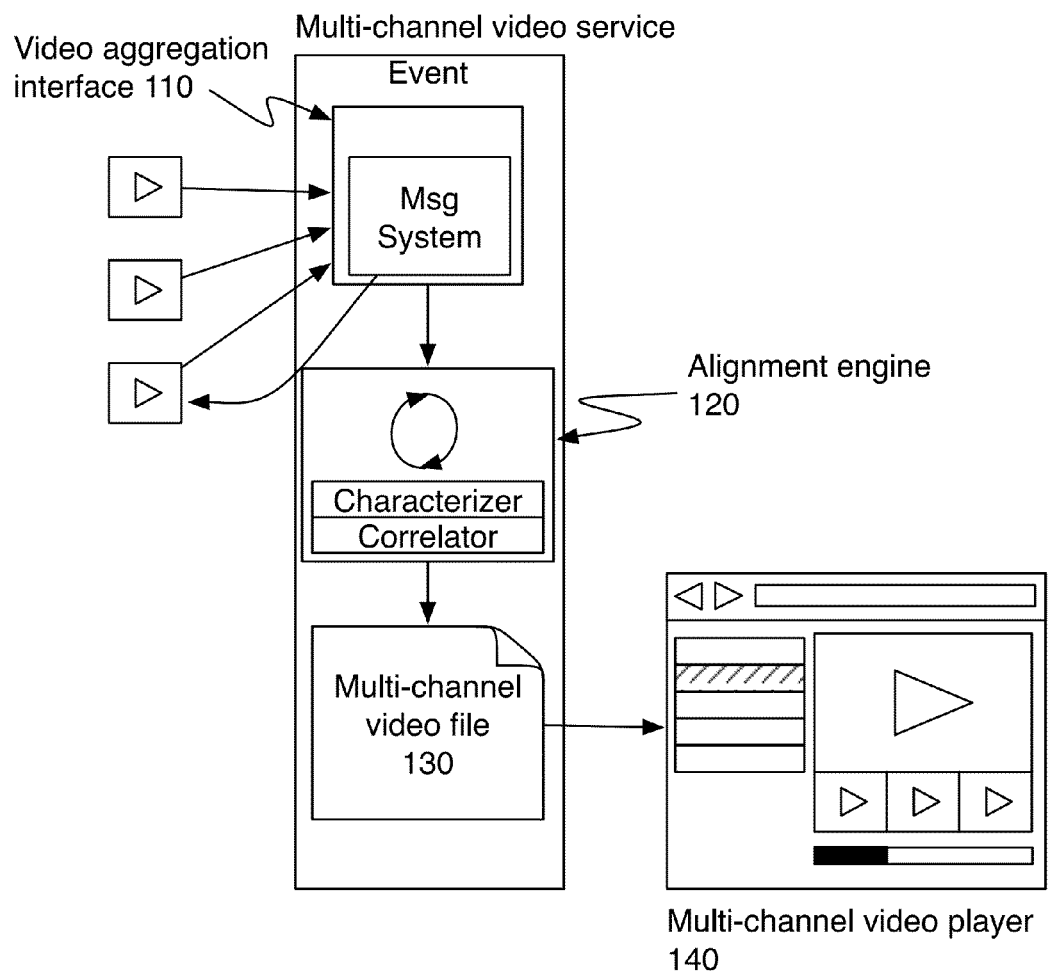
FIG. 2 is a schematic representation of a system for compiling and playing of multi-channel videos of a preferred embodiment.

As shown in FIG. 2, a system for compiling video segments into a continuous video stream of a preferred embodiment includes a video aggregation interface 110, an alignment engine 120, a multi-channel video file 130, and a multi-channel video player 140. The system is preferably implemented through a multi-channel video service, which is preferably at least partially a network accessible service system (e.g., website, API accessible service, etc.) to facilitate video collection from distributed sources. The system may alternatively be a local application, a distributed application, or implemented through any suitable processing service. The video aggregation interface no, alignment engine 120, and multi-channel video file 130 are preferably at least partially components of the multi-channel video service. Portions of the system may be partially implemented by participant applications operable on a device of a participant.

The video aggregation interface 110 functions to collect video segments from disparate sources. The video aggregation interface 110 may be configured to collect video segments from a variety of different types of sources. In a first variation, the video aggregation interface 110 collects video segments from participant videographers. A participant videographer is any user that captures video or related media and adds the media to an event through the video aggregation interface no. The aggregation interface may include an event messaging system. Through the messaging system, an organizer of an event can preferably create an event, add participants, and communicate or coordinate with participants. The aggregation interface may be a participant operated application such as a smart phone, a tablet, a digital camera, a digital video camera, or any suitable device. The participant application preferably facilitates capture of video and uploading of videos segments to a server of the video aggregation interface no. The participant application may additionally push notifications and deliver messages communicated through the event messaging system. In one variation, the aggregation interface application transmits participant updates to aid in synchronizing actions of participants. For example, the video aggregation interface 110 may facilitate automatically directing a participant when to film based on location of the participant at a venue relative to other participants, number of videos being captured at a particular time, event timing, quality of captured video and/or audio. As an alternative to an application or in addition to the application, the video aggregation interface no may include a video upload endpoint such as a webpage for uploading videos for an event, a MMS endpoint, email address, shared folder, or any suitable endpoint where a video may be delivered or uploaded.

Additionally or alternatively, the video aggregation interface 110 may include a video search engine which functions to collect videos based on a query. The video search engine preferably includes a search input user interface, such as: a video compilation application ('app') executing on a computer devices (e.g., smartphone, a tablet, or a television); or a video compilation website accessible through a web browser executing on a computer device (e.g., a smartphone, a tablet, or other digital device), a plug-in for a browser that accesses a video-sharing service (e.g., Chrome accessing YouTube), or any other suitable user interface.

The search input is preferably in the form of a search term that includes information indicative of the event, such as: who or what was involved in the event; the type of event; when the event occurred; where the event occurred; or any other relevant terms. In one example, in which the event is a music concert, the search input may be the search terms "itzhak perlman san francisco symphony 2012," "bright eyes lollapalooza 2011," or "Bruce Springsteen tour 27 july 2009." In another example, in which the event is a sporting event, the search input may be the search terms "49ers saints 14 jan 2012," "gardner karelin 2000 Olympics," or "24 heures de mans 2011." In other examples, the search input may be the search terms "uc davis pepper spray" (a protest), "Lockheed F-35 test flight 2007" (a demonstration), "Steve Jobs WWDC keynote 2011" (presentation), or "car crash hwy 101 @ hwy 92, 14:31 PST, 16 aug 2011" (accident), or any other suitable search term.

Alternatively, the search input may be substantially equivalent to a "Create Video Stream" button, wherein, when viewing a particular video segment of a particular event, the user may select the "Create Video Stream" to initiate the subsequent steps of the method; a video stream incorporating other video segments from the event may be assembled based on metadata (e.g., title, date, tags, creation location) of the particular video segment or any other relevant indicator of the event. However, the search input may be any other type of input comprising any other type or form of pointers to the event.

The video search engine preferably uses the search input to identify related videos that can be compiled into a multi-channel video. The videos identified are preferably suspected of belonging to the same event. The videos may be hosted by the entity implementing the multi-channel video system, but the videos may additionally or alternatively be selected from at least one outside video hosting source. The video files or pointers to the videos are preferably submitted to the alignment engine 120. At least a subset of the videos is preferably used in creating the multi-channel video file 130.

The alignment engine 120 functions to process the videos and align the videos according to an extracted timeline of the event. The alignment engine 120 may use any suitable process to align the videos. Preferably, the alignment engine 120 uses a fingerprint module, which functions to characterize the videos, and a correlation module, which functions to align videos by a fingerprint. The fingerprint module preferably creates a unique identifier of a common unifying signal in the video. Audio of the video segments will typically capture at least some common audio signal while the video segments will typically capture an event from differing perspectives and may not have any corresponding visual information. Thus, the fingerprint module preferably uses the audio to create a unique identifier. For example, at a music venue, participants may be video taping various portions of a venue, but the music played by the musicians will be prevalent in each video. The correlation module uses the fingerprints of at least two video segments to predict likelihood of a particular overlap. Timestamps, preferably synchronized to a standard time, and/or location information can additionally contribute to alignment of videos. The alignment engine 120 may additionally include a user interface component to adjust or set video alignment. The alignment engine 120 is preferably hosted on a server but may alternatively be an application executable on a computing device.

Figure 3A:
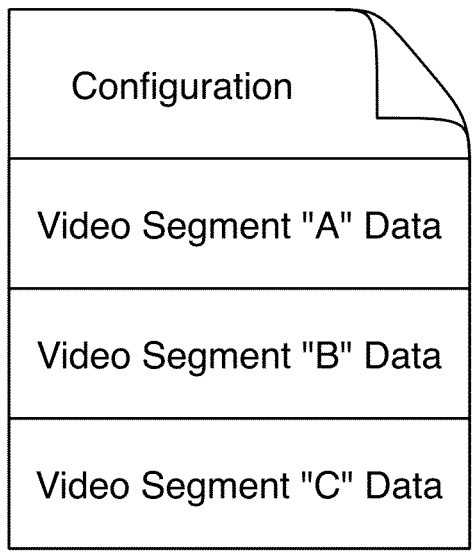
FIGS. 3A and 3B are graphical representations of variations of multi-channel video file structures.
Figure 3B:
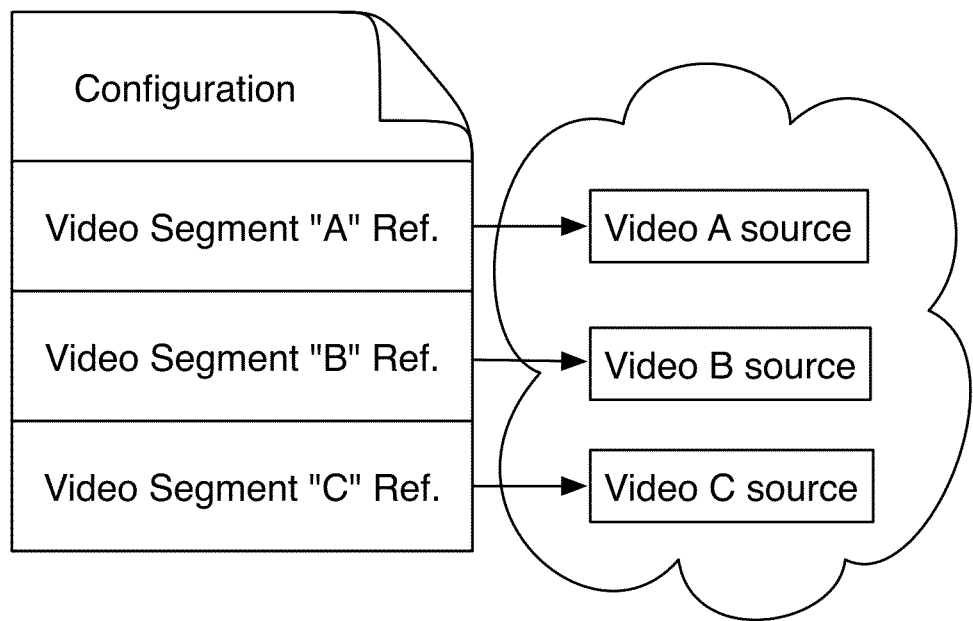

The multi-channel video file 130 is a datafile that characterizes a playable video composed of a plurality of video segments. As described above, an active video stream of the multi-channel video preferably seamlessly plays multiple video segments. Optionally, the multi-channel video file 130 may include selectable channel options to select the currently active video segment when at least two video segments are aligned within an overlapping portion of the timeline of the multi-channel video file 130. The multi-channel video file preferably includes configuration data that parameterizes the timeline and event-synchronized alignment of video segments to the timeline. In one variation, the configuration data includes resource identifiers to video segments. The resource identifiers (e.g., URI's or file pathnames) may reference videos hosted by another service as shown in FIG. 3A. The multi-channel video file will typically be dependent on access to the video segments to play. The multi-channel video may alternatively be a media file that includes embedded video segments as shown in FIG. 3B. The media file can preferably be downloaded and played or streamed from a server.

The multi-channel video player 140 is a user interface configured to render a video stream of the multi-channel video file 130. The multi-channel video player 140 preferably includes a first video frame where an active video stream is played. The multi-channel video player 140 will transfer to a subsequent video segment when a video segment ends or when a video channel is selected. The multi-channel video player may additionally include a channel selection interface component. The channel selection interface preferably displays currently available video channels for the current position in the timeline (e.g., playback position). The video channels are selectable, and upon selection, the active video stream changes to the video segment of the selected channel. Channels may be used to categorize and group a plurality of non-overlapping video segments. Video segments may be organized into channels based on author (i.e., which participant captured the video segment), location, quality, rating, or any suitable property of the video segments. The video segments are preferably streamed from distinct video files. The multi-channel video player preferably accounts for buffering and any playback disruption in coordinating video channel changes. The multi-channel video player is preferably a client based application such as a browser based player using flash, javascript, HTML5, or a client application using any suitable operable program code.

2. Method for Compiling a Multi-Channel Video

Figure 4:
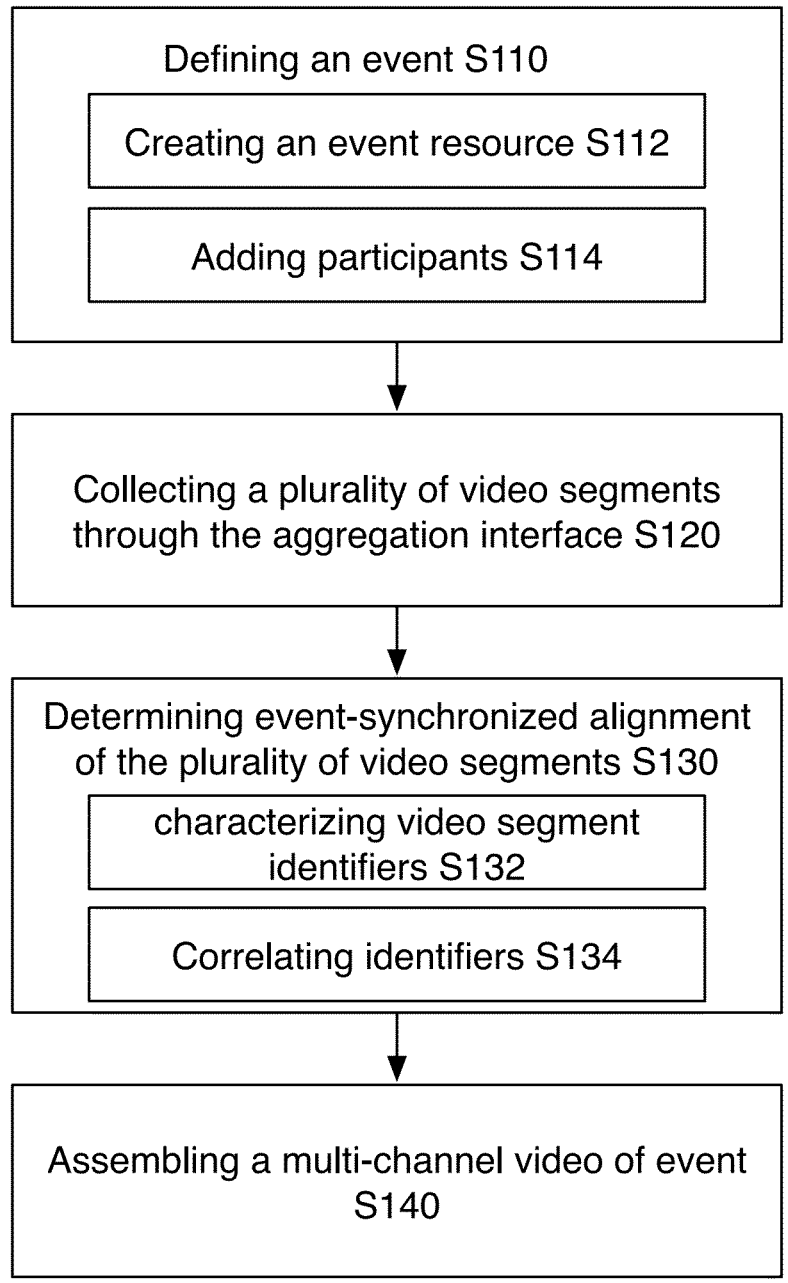
FIGS. 4-5 are flowchart representations of a method for compiling a multi-channel video of a preferred embodiment.
Figure 5:
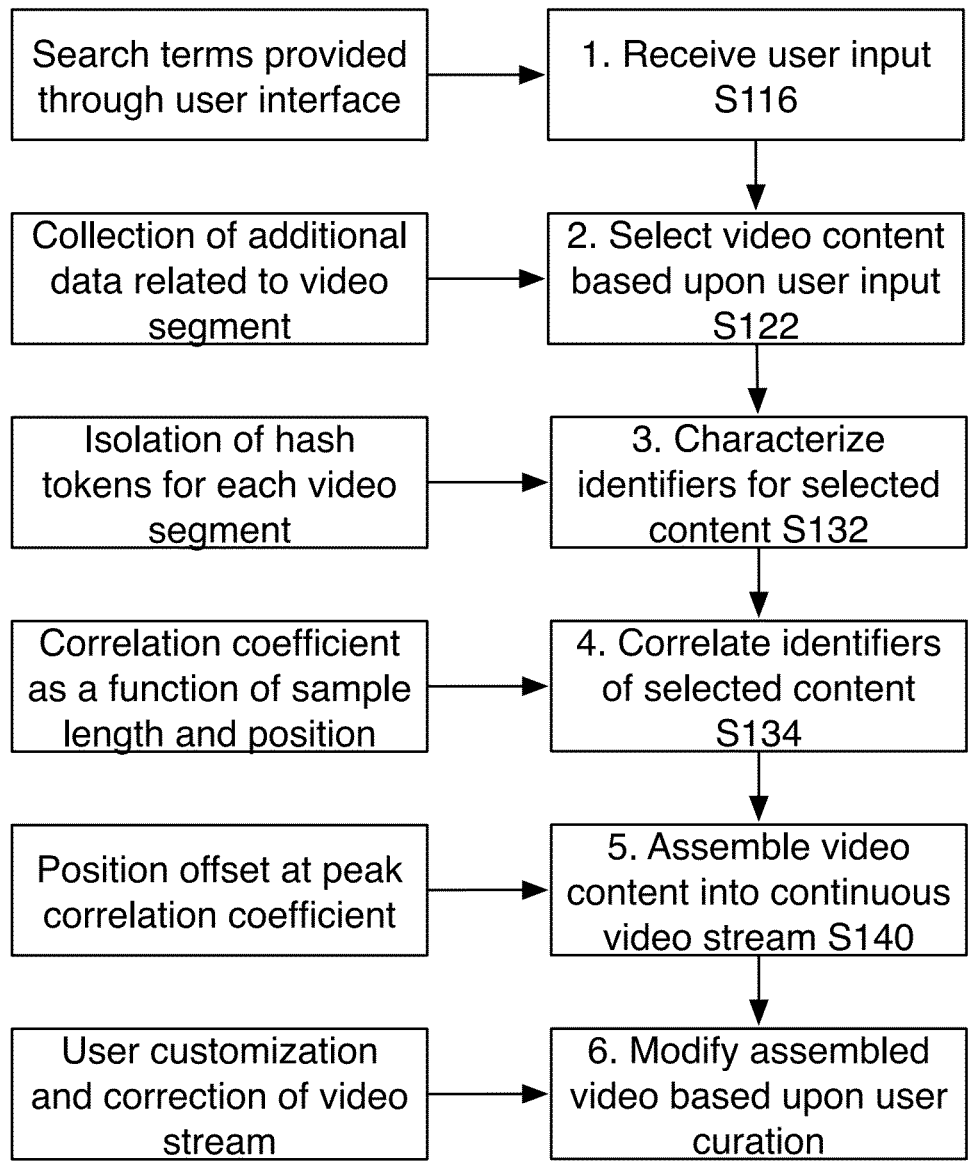

As shown in FIGS. 4 and 5, a method for compiling a multi-channel video of a preferred embodiment may include defining an event S110, collecting a plurality of videos through a video aggregation interface S120, determining event-synchronized alignment of the plurality of videos S130, assembling a multi-channel video file S140. A multi-channel service, operable as a network accessible service residing on at least one server or a local application component, preferably facilitates the collection of video segments and assembling of a multi-channel video. The method is preferably implemented by the system described above but may be implemented by any suitable system.

Step S110, which includes defining an event, functions to characterize an event for which a multi-channel video will be made. An event is preferably a unifying construct defined for at least one multi-channel video. The event acts as an identifier for related video segments. The event will preferably be a transient real-world occurrence in a confined physical location and within a defined time period. The event may alternatively occur in a virtual location and/or occur over multiple periods of time. The event will preferably include a textual description of a distinct occurrence. An event may alternatively be parameterized into an exact description such as by specifying geographic location and time. The event may be any of a music concert, a play, an opera, a sporting event, a lecture, a speech, a protest, a presentation, a demonstration, an accident, a party, a game show, or any other suitable event. An event may be defined in various ways depending on the type of aggregation interface used to collect video segments.

Figure 6:
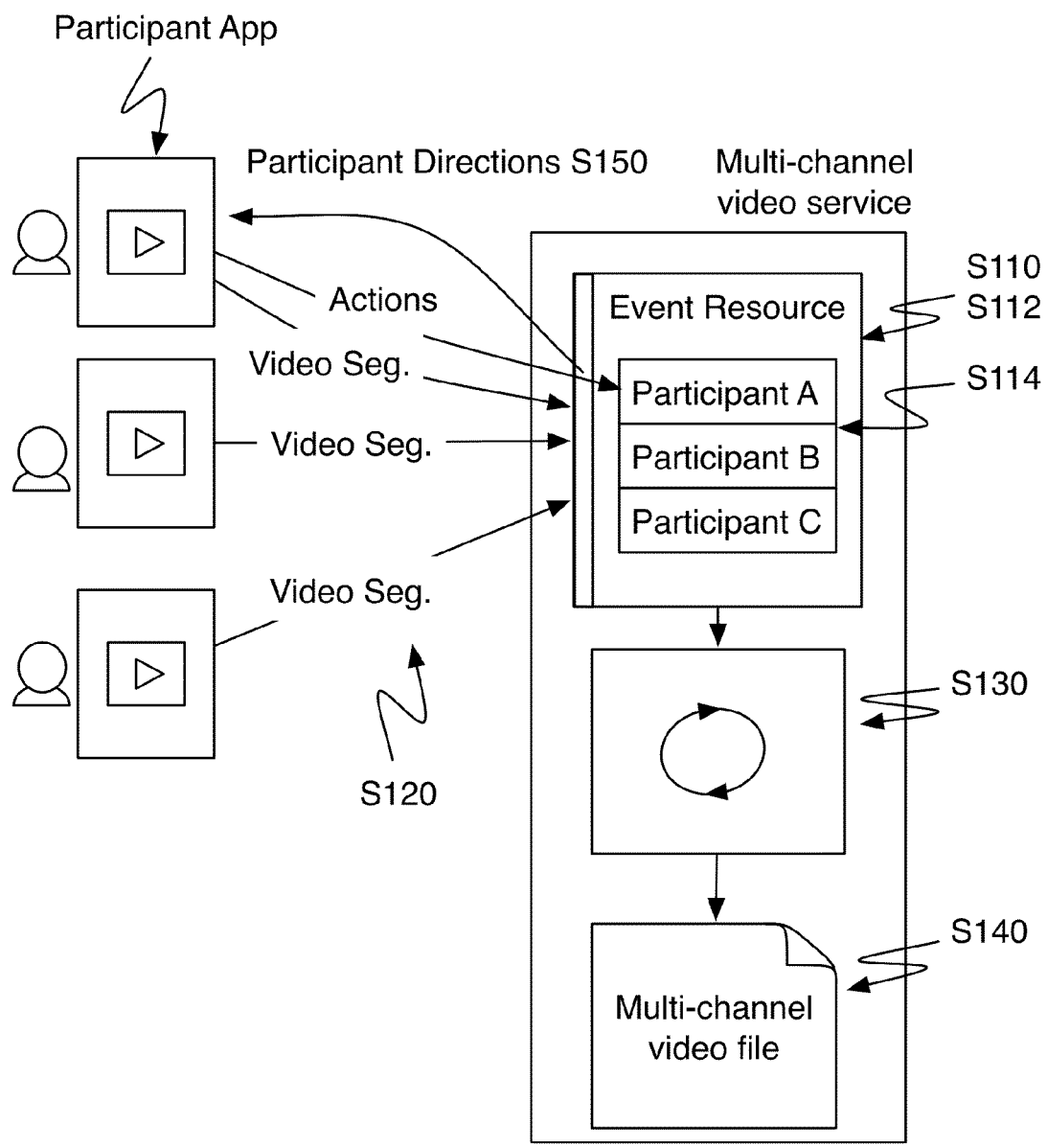
FIGS. 6-7 are schematic representations of a method for compiling a multi-channel video of a preferred embodiment.

As shown in FIGS. 4 and 6, defining an event may include creating an event resource S112, which functions to create an event within the multi-channel video service. The event is preferably created as an application data model, which may be further embodied in an event webpage or application representation of the event. An event will preferably be used to organize and create at least one multi-channel video. Alternatively, a sequence or collection of multi-channel videos may be created from video segments associated with the event. For example, an event may be created for a music festival; multi-channel videos could be created for the various songs and artists within this one music festival event. The event resource preferably has various properties used to distinguish the event. The event resource can include a title, description, time, location, entities participating in the event (e.g., related artists, related sports teams), descriptive tags, related media (e.g., set list for a concert, event program, transcript of performance), or any suitable properties. A multi-channel video of an event can preferably be accessed by visiting a webpage or application representation of the event.

Creating an event resource may additionally include adding event participants to the event resource S114, which functions to enlist users that can contribute video segments for the event. Participants preferably attend the physical event, capture video, and contribute at least one video segment. When creating an event, an event organizer will typically invite participants using an email list. The participants are then provided access to the video aggregation interface. In one variation, the participants are prompted to register an account or login to the multi-channel video service to participate in the event. Participants may alternatively voluntarily join an event. For example, a participant may selectively join an event found in a catalog of events of the multi-channel video service. Similarly, participants (i.e., a user that submits a video segment used in a multi-channel video) can provide video segments anonymously by uploading video in an accessible event upload form. Participants may additionally passively contribute video content by uploading video to another service.

Figure 7:
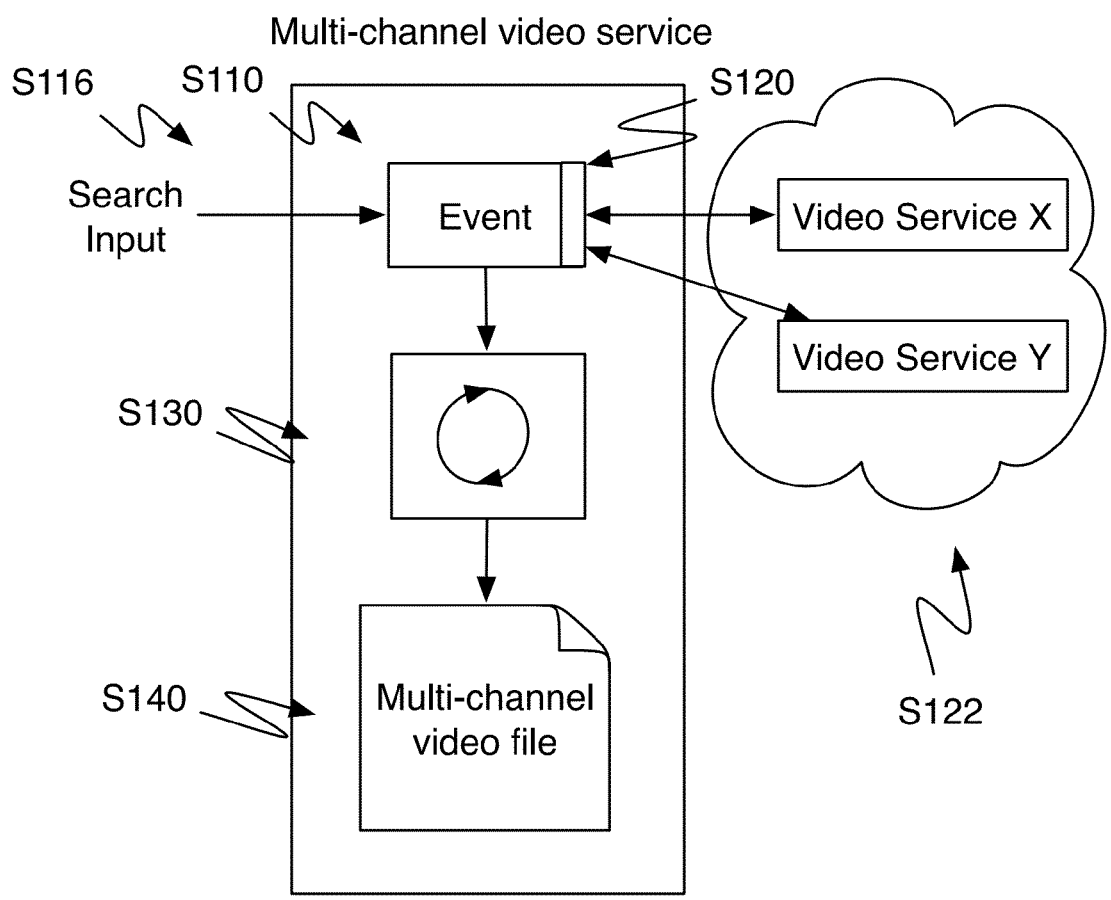

As shown in FIGS. 5 and 7, defining an event may additionally or alternatively include receiving a search input from a user S116, which functions to use a search input to define an event. The search input is preferably captured through a user interface, such as: a video compilation application ('app') executing on a computer device (e.g., smartphone, a tablet, or a television); a video compilation website accessible through a web browser executing on a computer device (e.g., a smartphone, a tablet, or other digital device); a plug-in for a browser that accesses a video-sharing service (e.g., Chrome accessing YouTube); or any other suitable user interface.

The search input is preferably in the form of a search term that includes information indicative of the event, such as: who or what was involved in the event; the type of event; when the event occurred; where the event occurred; or any other relevant terms. In one example in which the event is a music concert, the search input may be the search terms "itzhak perlman san francisco symphony 2012," "bright eyes lollapalooza 2011," or "Bruce Springsteen tour 27 july 2009." In another example in which the event is a sporting event, the search input may be the search terms "49ers saints 14 jan 2012," "gardner karelin 2000 Olympics," or "24 heures de mans 2011." In other examples, the search input may be the search terms "uc davis pepper spray" (a protest), "Lockheed F-35 test flight 2007" (a demonstration), "Steve Jobs WWDC keynote 2011" (presentation), or "car crash hwy 101 @ hwy 92, 14:31 PST, 16 aug 2011" (accident), or any other suitable search term.

Alternatively, the search input may be substantially equivalent to a "Create Video Stream" button, wherein, when viewing a particular video segment of a particular event, the user may select the "Create Video Stream" to initiate the subsequent steps of the method; a video stream incorporating other video segments from the event may be assembled based on metadata (e.g., title, date, tags, creation location) of the particular video segment or any other relevant indicator of the event. In such a variation, the metadata of the viewed video segment acts as the input similar to the search input described above. However, the search input may be any other type of input comprising any other type or form of pointers to the event.

Step S120, which includes collecting a plurality of video segments through a video aggregation interface, functions to enable videos from a plurality of sources to be collected for an event. Collected videos may be uploaded to the multi-channel video service and stored within the multi-channel video service for processing and possibly hosting of the video. The collected video segments may alternatively be characterized from an outside source. For example, a URI of a video on a video sharing site may be stored as a collected video. The collected plurality of videos may be any suitable combination of types of videos. The collected videos are preferably collected from multiple participants. At least a first and second video segments are collected from at least two participants. Typically, the at least first and second video segments overlap in event synchronization. Video segments of two participants will typically have differing perspectives of an event. A single participant can additionally contribute multiple video segments of an event, and any suitable number of participants may contribute video segments.

The multi-user video aggregation interface in a first embodiment is event participant driven and allows participants to submit videos for inclusion in a multi-channel video. The aggregation interface is preferably configured to collect video from disparate video sources. Additionally, the organization and management of participants may be further facilitated by an event messaging system. Participants can be organized into a "film crew" and may be directed in the capture of the event. The multi-user video aggregation interface in a second embodiment is driven by video identification. Videos related to an event are queried from a collection of videos (e.g., a video hosting website) and then assembled. In such a variation, participants are passive in the creation of a multi-channel video, in that video segments are pulled from individually hosted videos. The videos may come from a plurality of different sources.

In a participant driven variation, providing a multi-user video aggregation interface includes providing an uploading interface such as a participant application or website. A participant application is preferably an application operable on a mobile computing device but may be operable on a digital camera, a tablet computer, a desktop computer, and/or any suitable device. The participant application can additionally facilitate capturing video and/or selecting video. Video segments are preferably uploaded from the participant application to the multi-channel video service. In one variation, the participant application streams video to the video aggregation interface of the multi-channel video service. Location, timestamps, and/or other suitable video metadata can additionally be collected along with the video segment. In another variation, the uploading interface is located on a webpage accessible by at least the participants of an event. The uploading interface may be a page with a file upload form input, a Multimedia Messaging Service (MMS) endpoint, an email address (e.g., that can receive email attachments), a shared folder, or any suitable interface for transferring media.

In a variation employing video identification, providing a multi-user video aggregation interface can include selecting video content S122, which functions to select video segments that may be related to the search input. A video available on a video-sharing website or server is preferably selected based upon a correlation between the search input and metadata associated with the video segment. A video segment is preferably selected based upon terms (e.g., words, dates, pointers) shared between the search input and the title and/or filename of the video segment; however, any of a GPS tag, a comment, a creation date, a description, related video information, or any other metadata of the video segment may be compared against the search input to guide selection of the video segment for fingerprinting in the following step.

Video segments from a plurality of sources may be selected in this step. Relevant video segments are preferably searched for across multiple video-sharing websites or servers, such as YouTube and Vimeo, though video segments stored locally on a hard drive or device of the user, hosted in distributed storage of the multi-channel video system, or video content provided via any other source may also be selected. Additionally, non-video content may also be selected (or collected) in this step, such as: event data, including time, date, a set list, an outline, a transcription, or a game play list; event location or venue; live or post-event television or radio commentary; pictures of the event; the number of views of a particular video segment; or any other relevant data or content. In one variation in which the event is a music concert, a set list for the show may be collected from a band or symphony website or from a Facebook profile; this data may later be used to guide a user through the video stream, as shown in FIG. 1, or to check the order of video segments in the video stream. In another variation in which the event is a sporting event (e.g., a NFL football game), radio (i.e. purely audio) commentary may be collected such that the radio track may be laid over video content absent of professional commentary; the video stream may thus provide a user with information relevant to the event but with camera angles and views not typically available in a television broadcast. However, this and any other information may be collected in this step and subsequently used in any other way.

This step of selecting relevant video segments may be performed by a service distinct from any video-sharing website, app, or server; in one variation, the step of selecting video content may be performed by a third-party (e.g., independent) website, app, or software dedicated to video stream compilation and user curation. For example, Adobe may offer software, such as part of a Creative Suite package (e.g., CS7), configured to select and compile video content into a continuous video stream and to provide tools to a user for manipulation, customization, and production of the video stream. Alternatively, at least a portion of the method of the preferred embodiment may be integrated into a video-sharing website, app, or server. For example, YouTube may, internally, perform the step of selecting relevant videos soon after a user uploads, names, and/or tags a particular video; YouTube may also complete the ensuing steps of the method in order to present, to a user, a continuous video stream of compiled videos substantially soon after the user uploads, names, and/or tags the particular video. In the variation in which a third-party website, app, or service performs this step, video content (and other non-video content) is preferably tagged as relevant, such as with a pointer or link, but the video content preferably remains on the host server in order to minimize data storage requirements for the third-party website, app, or service. However, the step of selecting relevant video content and/or any other step of the method of the preferred embodiment may be completed by any one or combination of video-sharing or third-party websites, apps, services, or software.

Step S130, which includes determining event-synchronized alignment of the plurality of videos, functions to organize disparate video segments into a time organized multi-channel video file. The event-synchronized alignment can use any suitable process to determine the event-synchronized alignment. Event-synchronized alignment preferably describes determining a temporal positioning (and possibly scaling for video with different frame rates) relative to a reference timeline of which other video segments are aligned. Since the videos of two participants will typically capture a unique visual stream, the audio will preferably be used as a unifying signal when aligning the videos. Other unifying signals may additionally be used such as video timestamps, a game clock for a sporting event, visual cues of timing such as drastic changes in environmental lighting (e.g., pyrotechnics on stage), and/or any suitable time correlated signal. In one variation, participant applications track the capture of videos and map the relevant video segments to the event timeline. The audio of a video segment is preferably used to algorithmically identify arrangement and overlap of video segments. Determining event-synchronized alignment preferably includes fingerprinting each video of the plurality of videos S132 and correlating fingerprints of the plurality of videos S134.

Fingerprinting each video of the plurality of videos S132, of the preferred embodiment, functions to isolate and characterize timing and subject matter identifiers of each video segment. By isolating such unique identifiers and comparing fingerprints (i.e., characterized identifiers) of two or more video segments, content may be either positively correlated or deemed irrelevant and discarded. Furthermore, when two video segments are positively correlated, the identifiers may be used to align the video segments in time. The timing and subject matter identifiers are preferably audio-based, wherein an audio signal is extracted from a video segment and analyzed, though a visual signal or other data may be extracted from the video segment for analysis and fingerprinting.

Figure 8:
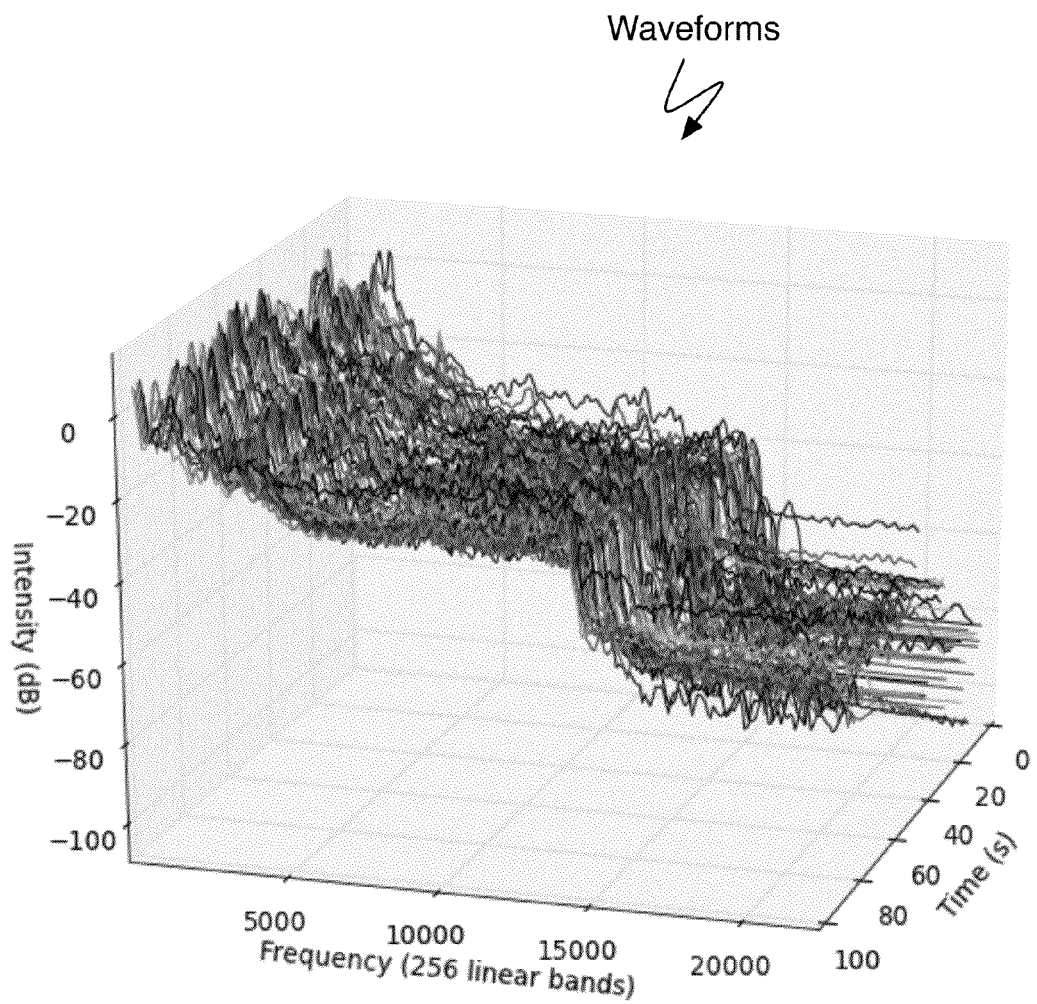
FIG. 8 is a graphical representation of a raw audio signal represented by multiple waveforms.
Figure 9:
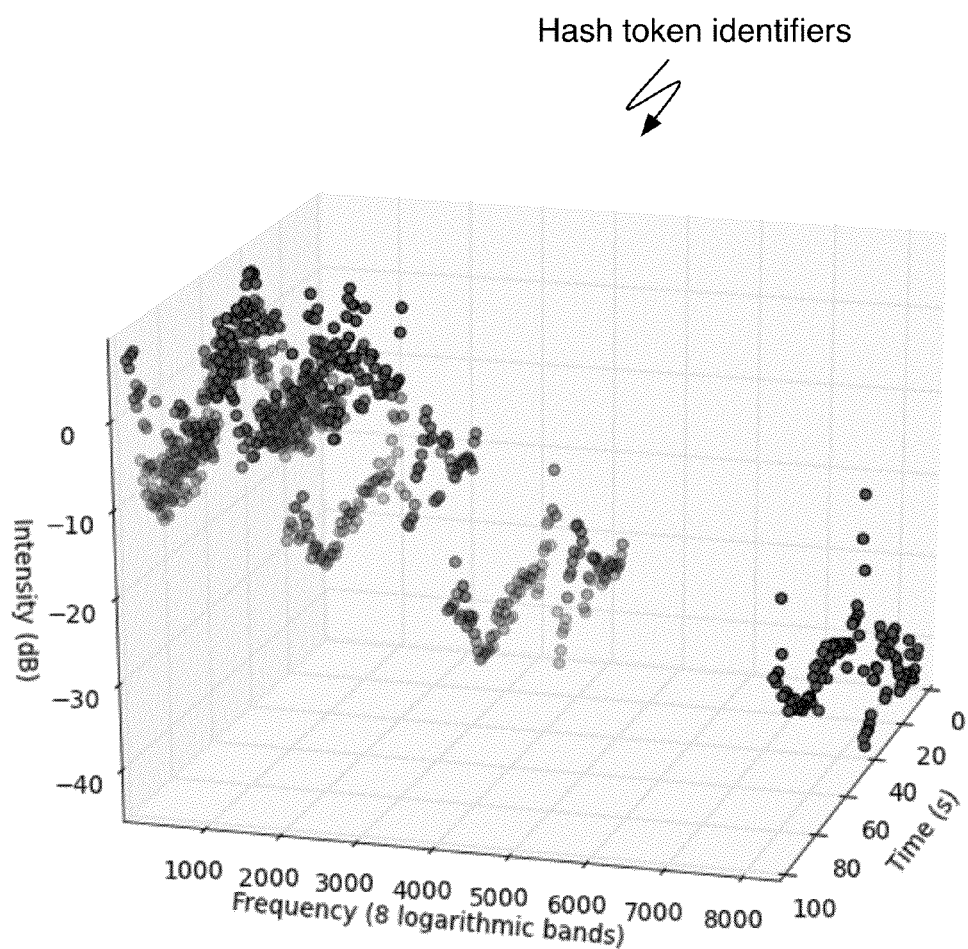
FIG. 9 is a graphical representation of a fingerprint, of a video segment, including hash tokens and representing compressed data of the original audio signal.
Figure 10A:
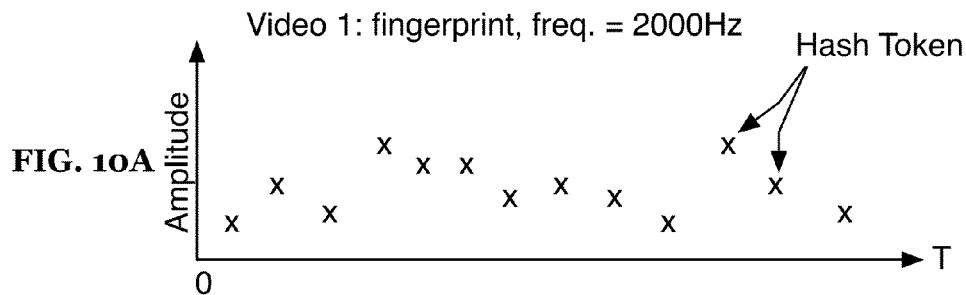
FIG. 10A is a graphical representations of hash tokens of a first video segment.
Figure 10B:
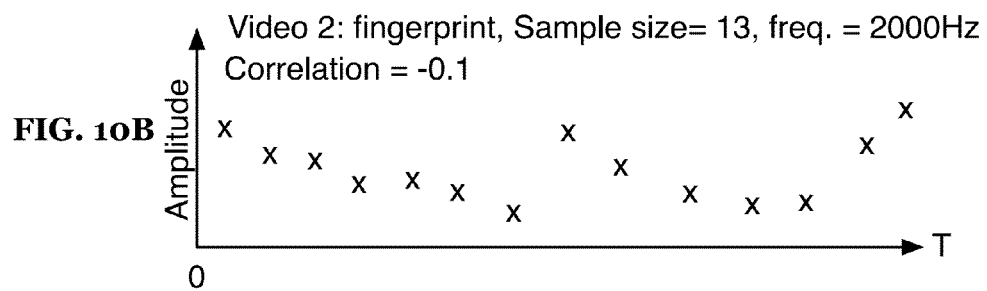
FIG. 10B-D are graphical representations of hash tokens of a second video segment are various offset positions.
Figure 10C:
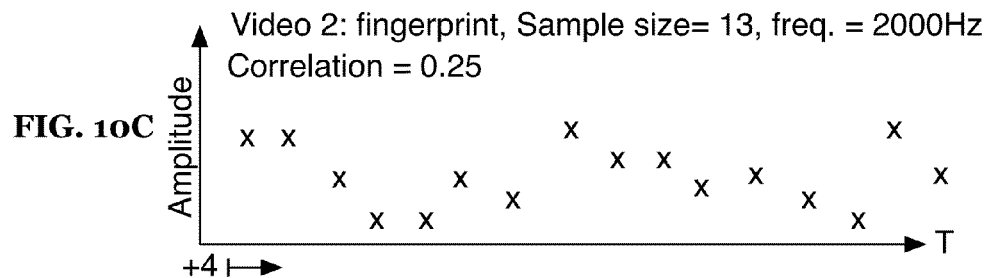
Figure 10D:
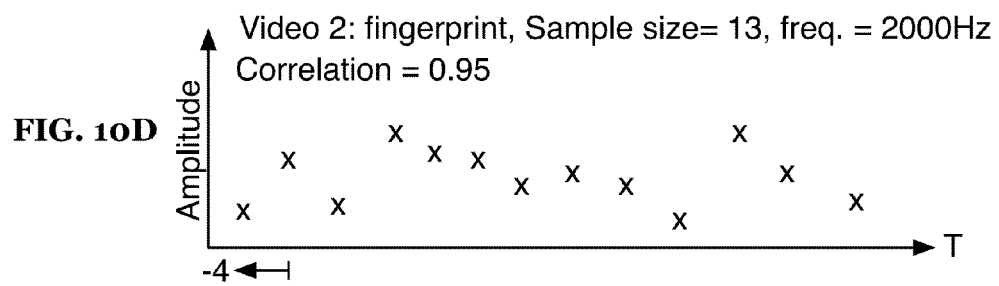

In the variation in which an audio signal of the video segment is fingerprinted, hash tokens of the audio signal preferably define the fingerprint of each video segment. Hash token may be extracted and analyzed as described in the "An Industrial-Strength Audio Search Algorithm," Avery L. Wang, 2003, which is attached as Appendix A and incorporated in its entirety by this reference. As shown in FIG. 8, the audio signal of each video segment may be a three-dimensional signal of a series of waveforms spanning a range of frequencies, wherein each waveform is arranged at a particular time instance. The hash tokens are preferably extracted from spectrogram peaks of the audio signal at particular frequency bands, such as eight frequency bands, as shown in FIG. 9. The fingerprint, comprising the hash tokens, may therefore represent a compressed form of the audio signal over the entire time length of the video segment. In particular, the fingerprint may represent approximately a 1000:1 compression of the audio signal, or any other compression ratio; this may significantly reduce computing and/or data storage requirements over manipulation of the original audio signal, particularly in the following step when fingerprints of various video segments are compared and correlated. However, other portions or combinations of portions of the video segments may be fingerprinted. For example, object and/or facial recognition software may be used to create a visual-based fingerprint of visual content within video segments.

The step of correlating fingerprints of the plurality of videos S134, of the preferred embodiment, functions to prove or disprove, with a certain degree of certainty, relationships between two or more video segments. In this step, the fingerprint of a first video segment is compared against the fingerprint of a second segment. Because the audio signals of the video segments are time-based, the fingerprints thereof preferably also comprise a time component. However, the first and second video segments: may or may not be of the same event; may be of the same events but may not start at the same time during the event; may be of the same events but may not end at the same time during the event; and/or may be of the same event but may or may not include overlapping periods of the event. Therefore, time-based alignment of portions of the fingerprints of the first and second video segments may define key or primary proof of correlation between two video segments. In particular, a portion of the fingerprint of the first video segment that is substantially similar or identical to a portion of the second video segment may substantially prove a relationship between the two video segments. The substantially similar or identical portions of the fingerprints preferably defines a plurality of hash tokens along the same frequency bands, time intervals, relative amplitudes, and/or any other information stored within the hash tokens; the greater the number of adjacent hash tokens shared between the fingerprints of the two video segments, the greater the certainty that the fingerprint portion shared across the first and the second video segments is indicative of a relationship between the two video segments.

Figure 11A:
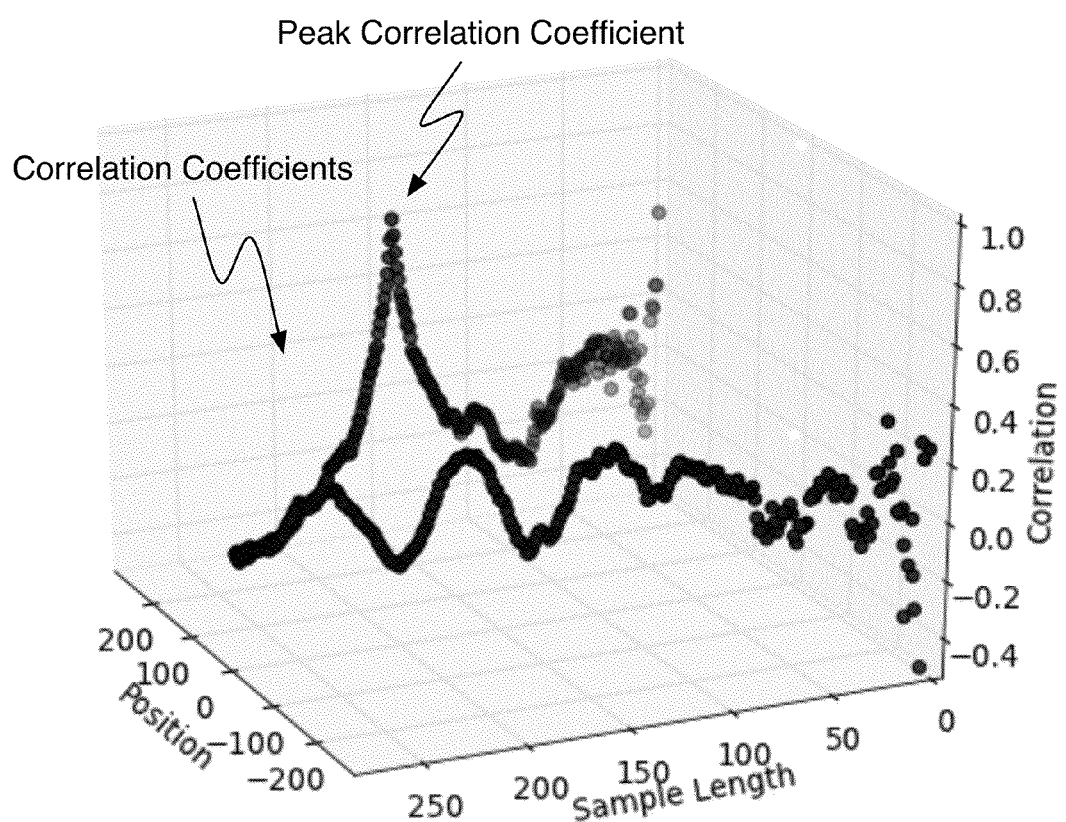
FIG. 11A is a graphical representation of fingerprint correlation coefficients for two video segments as functions of sample length and relative position of the video segments.
Figure 11B:
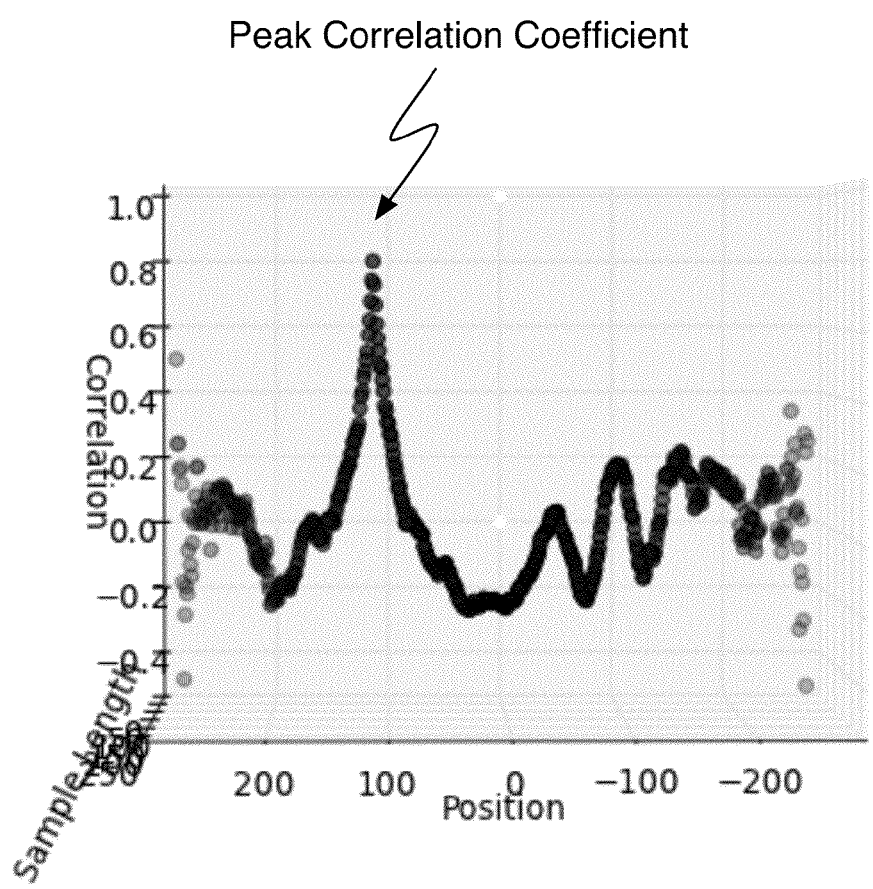
FIG. 11B is a graphical representation of fingerprint correlation coefficients, including a peak correlation coefficient.

FIGS. 10A-10D depict, in two-dimensional space, a fingerprint portion shared between the first and second video segments. In the process of correlating the fingerprint of the second video segment (FIGS. 10B-10D) with the first video segment (FIG. 10A), the position of a series of hash tokens, of a sample length (e.g., thirteen hash tokens), of the second fingerprint is varied and checked relative to the hash tokens of the first fingerprint; for various offsets of the sample of the second fingerprint relative to the first fingerprint, the correlation coefficient (level of correlation) between the second sample and the first fingerprint varies, such as from −0.1 (very little to no correlation) to 0.95 (very high correlation). Correlation coefficient values for various sample lengths and offsets (positions) of the second fingerprint relative to the first fingerprint may be combined into a three-dimensional map or plot, as shown in FIGS. 11A and 11B, depicting the correlation between the first and second video segments for a given offset of the video segments; this map may further provide insight into confidence in various correlation coefficients, wherein the greater the sample length (length of the shared fingerprint portions), the greater the certainty of the correlation coefficient for a particular offset of two video segments. As shown in FIGS. 11 and 7B, for a position of approximately '120' (e.g., approximately +120-second offset) and a sample length of approximately '200' hash tokens, the correlation coefficient of the first and second video segments is approximately '0.82,' at other positions and sample lengths, the correlation coefficient drops. The occurrence of the distinctive peak in FIG. 11B may be indicative of: (1) a high likelihood that the first and second video segments are related (e.g., include content of the same event); and (2) the proper alignment (e.g., offset, position) of the first and second video segments in time. These correlation coefficients are preferably computed by implementing a vanilla correlation method incorporating normalized covariance matrices.

Figure 12:
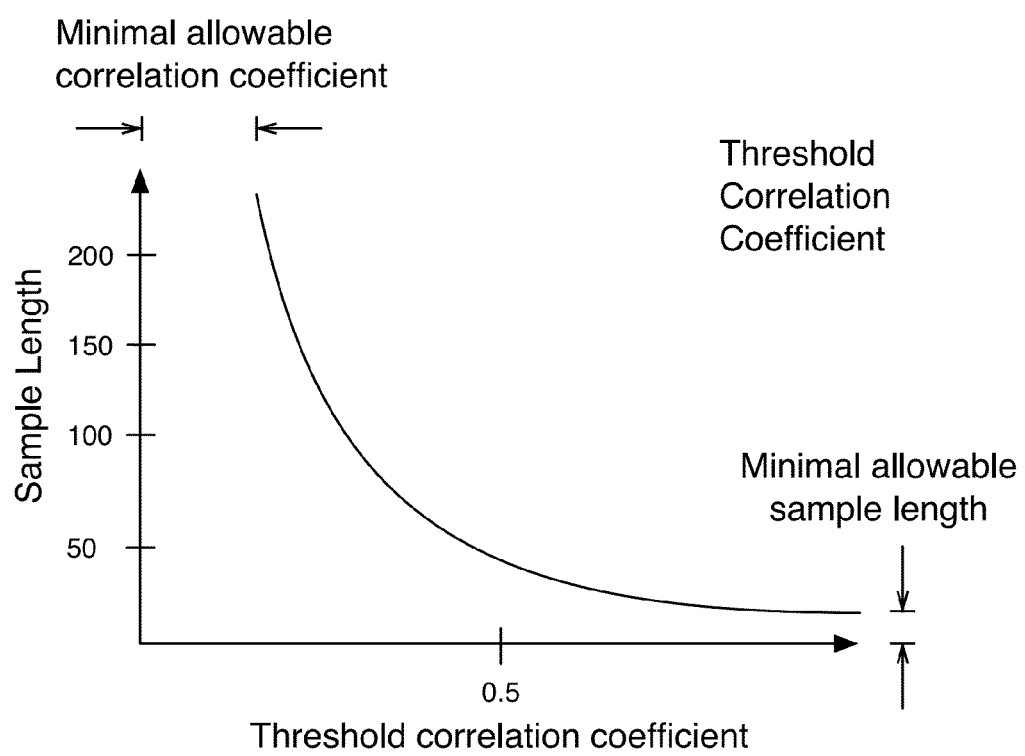
FIG. 12 is a graphical representation of a threshold correlation coefficient dependent upon sample length.

A peak correlation coefficient of the first and second video segments is preferably tested against a threshold correlation coefficient, wherein a peak correlation coefficient less than the threshold correlation coefficient substantially disproves a relationship between the first and second video segments, and wherein a peak correlation coefficient greater than the threshold correlation coefficient substantially proves a relationship between the first and second video segments. Furthermore, the threshold correlation coefficient may vary for various sample lengths, as shown in FIG. 12. For example, for relatively short sample lengths with little time overlap between two video segments (e.g., less than 5 seconds), the correlation coefficient must be relatively high (e.g., >0.95) in order to substantially prove that the two video segments are related; however, for relatively long sample lengths with much time overlap between two video segments (e.g., more than 60 seconds), the correlation coefficient may be relatively low (e.g., greater than 0.4) but still substantially prove that the two video segments are related. The variable threshold correlation coefficient may be of any other form (e.g., stepped or non-continuous). Furthermore, as shown in FIG. 12, the variable threshold correlation coefficient preferably defines a minimum correlation coefficient, regardless of sample size, to prove the relationship between two video segments, and a minimum allowed sample size (e.g., greater than 50 hash tokens) for comparison of two video segments is also preferably defined. Of note, the threshold correlation coefficient is preferably less than '1.0,' as this may permit some variation between two video segments, such as caused by noise (e.g., cheering from a crowd), frequency shift, missing data due to compression, or distortion of the audio signal of one video segment relative to the audio signal of the other video segment. However, the relationship(s) between video segments may be proven in any other way and a threshold correlation coefficient may be defined in any other way.

In the variation in which the selected video content includes more than two video segments, the correlation coefficient (and offset) of each video segment relative to another video segment is preferably recorded. For example, for selected video content including a first, a second, and a third video segment, a first correlation coefficient is preferably calculated for the first and second video segments; a second correlation coefficient, for the first and third video segments; and a third correlation coefficient, for the second and third video segments. First, second, and third positions (e.g., offsets) between the video segments may also be recorded. Furthermore, when the selected video content includes three or more video segments, each video segment may be cross-correlated with multiple other video segments to improve the confidence in the correlation or relationship between any two video segments. In this variation, higher correlation coefficients for longer sample lengths preferably take precedence over and lower correlation coefficients for shorter sample lengths. Other data may also be used to check calculated relationships between two or more video segments, such as the title of various video segments (e.g., "part 1/3", "part 2/3," and "part 3/3"). However, video segments may be correlated and relationships therebetween proved or disproved in any other way. Finally, video segments shown to be unrelated to one or more other video segments are preferably discarded or "pruned" from the video content selection in this step.

Step S140, which includes assembling a multi-channel video file, functions to align the video segments in time, and to arrange video segments with overlapping content into multiple channels to create the continuous video stream. The assembled multi-channel video file may be a video file that embeds the video data of the video segments. Alternatively, the multi-channel video file is digitally stored information that characterizes the video segment content and arrangement. The video segment content is preferably characterized by storing video source information such as a file pathname or a URI at which the video may be accessed. The multi-channel video will preferably include a plurality of video segments that are preferably arranged into selectable channels. A multi-channel video will typically have at least two simultaneously selectable video channels (i.e., an option to watch one of at least two videos that capture substantially the same moment of time from differing perspectives). The sum length of all the video segments is typically longer than the length of the multi-channel video. In other words, video segments will typically have overlapping portions.

Figure 13A:
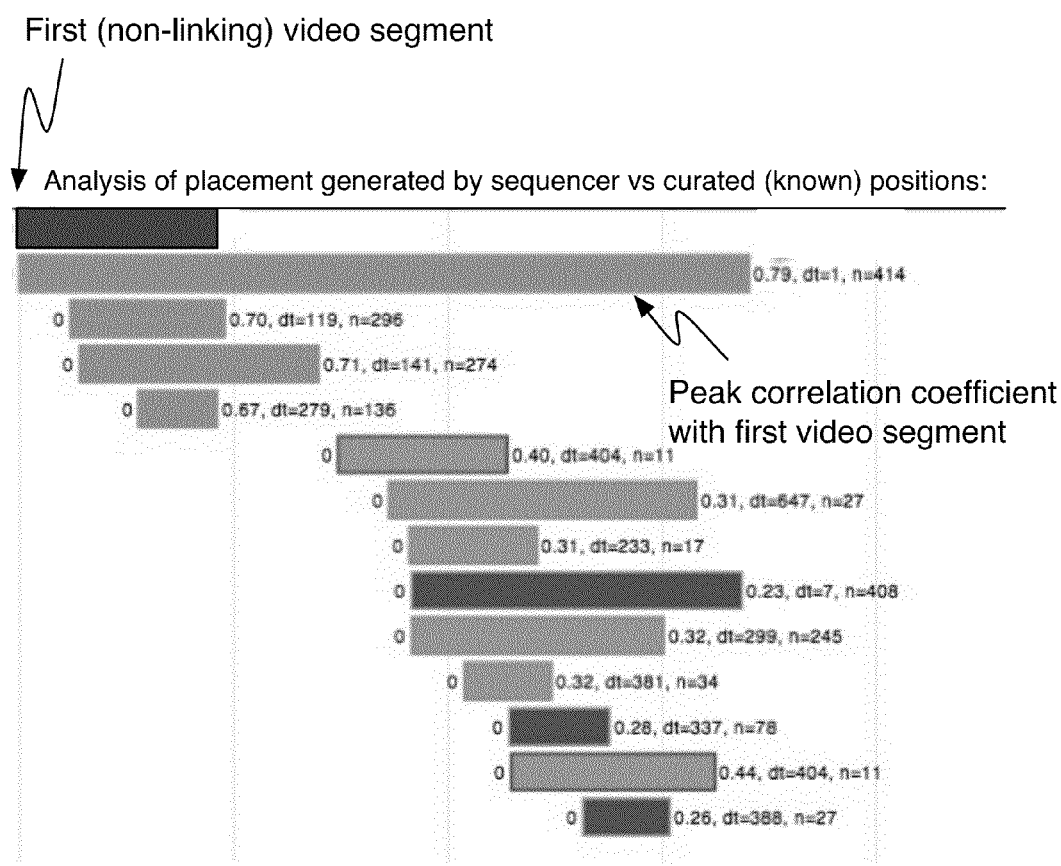
FIG. 13A is a graphical representation of multiple video segments, following alignment, with correlation coefficients of each video segment relative to a non-linking video segment.
Figure 13B:
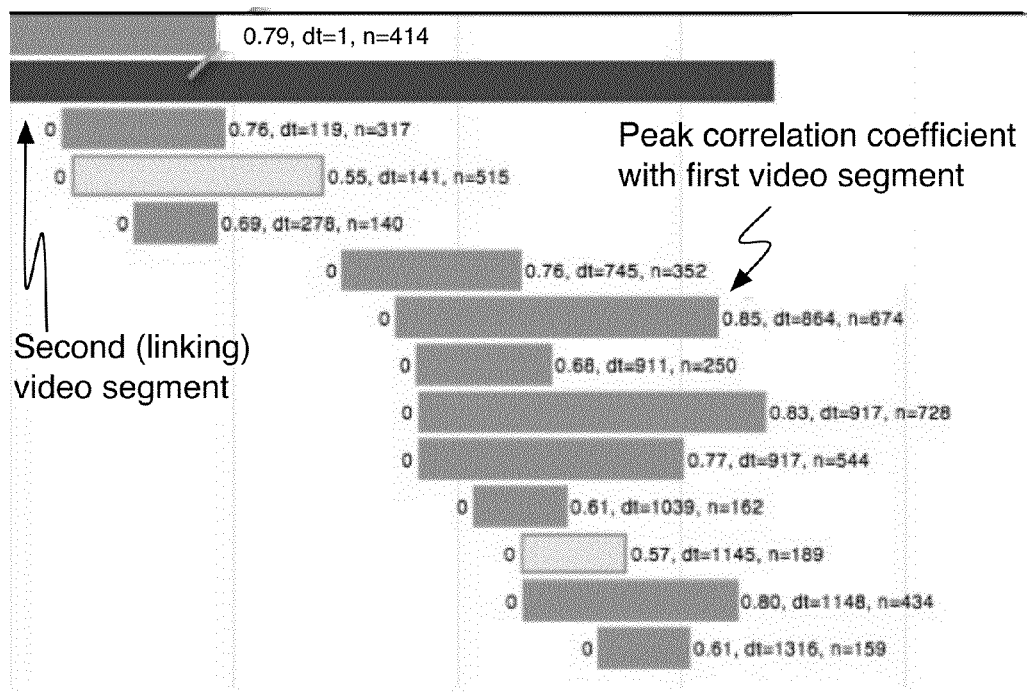
FIG. 13B is a graphical representation of multiple video segments, following alignment, with correlation coefficients of each video segment relative to a linking video segment.

As shown in FIGS. 13A and 13B, multiple video segments with sufficient overlapping portions (substantially similar hash tokens over a sample length) may be aligned based upon the position (offset) value associated with the peak correlation coefficient recorded in Step S134; video segments without sufficient overlapping portions are preferably tagged with substantially low correlation coefficients, but bridging video segments, with sufficient correlations coefficients with two non-overlapping video segments, may link two non-correlated video segments, as shown in FIG. 11B. Meta data, such as a set list or the title or filename of a video segment, may also be used to determine and/or check video segment arrangement. For example, if a bridging video segment does not exist for two sets of video segments, a filename of one video segment that is "bright eyes lollapalooza 2011 pt 1/2" may indicate order relative to a second video segment that is "bright eyes lollapalooza 2011 pt 2/2." However, the order of video segments within the video stream may be determined and/or checked in any other suitable way.

In one alternative embodiment, when assembling the multi-channel video, the audio may additionally be selected or modified. As mentioned above, audio may act as a unifying signal for determining event-synchronization. The unifying signal portion (e.g., the song being played at a concert) may be enhanced. In one variation, an audio track either of an audio file or of a video segment may be selected to use as the main audio track. Audio from other video segments may be mixed with the main audio track and/or dynamically mixed with the main audio during playback of the multi-channel video file. Furthermore, the audio (volume), contrast, and/or brightness levels across various video segments may also be matched when the video segments are assembled into the multi-channel video file. Such adjustments are preferably reflected in the playback of the multi-channel video file.

Additionally, a method of a preferred embodiment may include coordinating event participant communication S150, which functions to organize participants of an event. In some cases the participants of an event will have little to no pre-established relationships (e.g., two strangers attending the same concert). In other words, participants would not act in a coordinated fashion. Coordinating event participant communication can optimize the capture of video segments. Such coordination may ensure full coverage of an event by amateur, crowdsourced, and/or volunteer participants that are capturing short video segments of an event. Such participants may use smart phones and other mobile devices, which typically cannot provide long duration videos due to battery, memory, and data uploading limitations. Coordinated participant communication can facilitate capturing an event in an organized and controlled manner.

An event administrator page is preferably configured to enable an event organizer to send notifications to participants such as an email or push notification. Event updates such as notifications of the start of an event, the start of a new song, a grand finale or any other important aspect of an event can be transmitted to one or more participant. In one variation event participants use the participant application. Coordinating event participant communication can additionally include a participant application tracking participant actions during an event. The participant application will preferably monitor and track when a user captures video, the location of the user, type of video device, quality of recent/current video segments (e.g., is the image under or over exposed), the quality of recent/current audio (e.g., background noise level), content of recent/current video (e.g., face or object detection), or any suitable properties of the participant. The participant actions are preferably transmitted to the multi-channel video service where a plurality of participant actions is processed. The method may additionally include generating participant instructions. The participant instructions are preferably generated to optimize the multi-channel video quality. A high quality multi-channel video will typically have video segments that could be assembled to form a continuous stream (e.g., no missing event coverage), and having at least a portion of the video stream with multiple selectable video channels from significant differing perspectives. The participant instructions may be used to address a need for more/fewer video segments that capture a particular time, from a particular location, that capture particular content (e.g., video of the crowd, video of the drummer, etc.), of a high level of image or video quality, and/or any suitable type of video segments. The participant instructions may be generated for an individual participant, subset of participants, or all participants. The participant instructions are preferably transmitted to the intended audience.

In one exemplary application of the participant instructions, the multi-channel video service when tracking participants at a music event may detect that there is a first participant capturing a particular song. The multi-channel video service may identify another participant that previously captured a video segment with high quality video and the second participant is not located substantially near the first participant. The multi-channel video service sends a push notification to the application of the second participant instructing the participant to capture video. If the second participant captures a video segment when directed to, the multi-channel video will preferably have two video channels with different views instead of just one if the second participant wasn't prompted. Participant instruction can be used to automatically optimize the capture of a valuable video segments at an event.

3. Method for Playing a Multi-Channel Video

Figure 14:
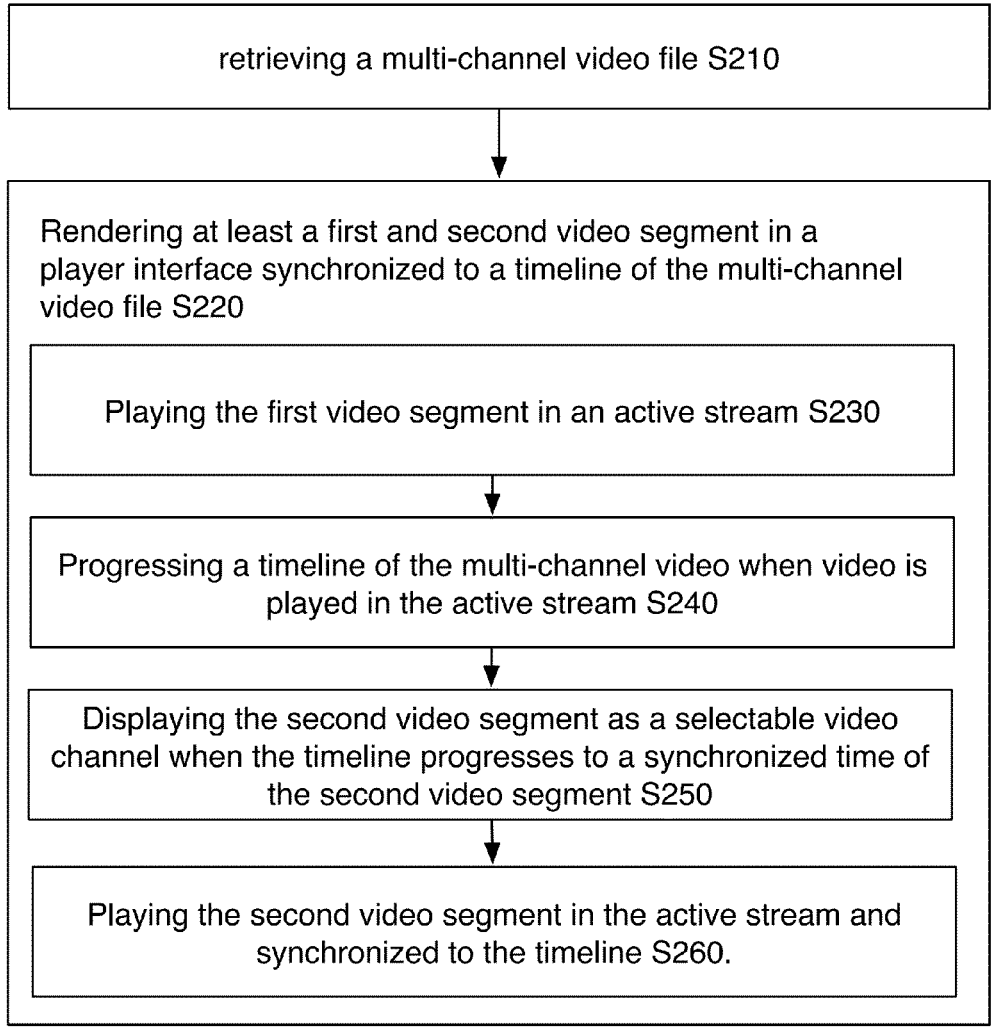
FIG. 14 is a flowchart representation of a method for playing a multi-channel video of a preferred embodiment.

As shown in FIG. 14, a method for playing a multi-channel video of a preferred embodiment may include retrieving a multi-channel video file S210 and rendering at least a first and second video segment in a player interface synchronized to a timeline of the multi-channel video file S220, rendering the multi-channel video further comprising playing the first video segment in an active stream S230, progressing a timeline of the multi-channel video when video is played in the active stream S240, displaying the second video segment as a selectable video channel when the timeline progresses to a synchronized time of the second video segment S250, and playing the second video segment in the active stream and synchronized to the timeline S260. The method functions to provide an engaging interface for viewing of a multi-channel video. As described above, a multi-channel video will typically have multiple video channels with video segments that are synchronized to a timeline of an event. Video segments may fully overlap, partially overlap, border one another, be linked through at least one other video segment, and/or have discontinuity between the video segments. The method for playing a multi-channel video may be used in combination with the methods and systems of preferred embodiments as described herein. The method is preferably implemented in a user interface of a website or an application as shown in FIG. 1. The method is preferably used in displaying a single active video stream, but may be modified to display any suitable number of simultaneous active video streams of a multi-channel video file.

Step S210, which includes retrieving a multi-channel video file, functions to access data to control playback of a multi-channel video. The assembled multi-channel video file may be a video file that includes embedded video data of the video segments. Alternatively, the multi-channel video file digitally stores information that characterizes the video segment content source and alignment. The multi-channel video file is preferably a file substantially similar to the multi-channel video file assembled in the method described above. The multi-channel video file preferably includes timeline alignment of the video segments such that the multi-channel video file defines when and how video segments are aligned to a synchronized timeline. The timeline is preferably a continuous and constant time progression of an event captured by the multi-channel video file. In some variations, the time progression may not be continuous (e.g., gaps in the timeline) or have a constant time progression (e.g., video segment includes fast or slow motion video). Video segments of the multi-channel video file are preferably synchronized to at least one distinct point in the timeline. Slow motion videos, fast motion videos, videos that combine multiple portions of an event (e.g., a video previously edited by a participant), and other videos with internal timelines that do not correspond to a shared time progression of other video segments may include multiple or a continuous definition of timeline synchronization. For example, a slow motion video segment may have the beginning and ending mapped to two points in the timeline. The multi-channel video file is preferably downloaded to a player interface on a client device. The player interface may be playable on a web browser, a browser plug-in, and/or an application. The multi-channel video file may alternatively be processed and played through a streaming interface. A server may interact directly with the file and stream video or data of the file to a client device.

Step S220, which includes rendering at least a first and second video segment in a player interface synchronized to a timeline of the multi-channel video file, functions to play the multiple video segments of a multi-channel video file. Although the video content is preferably presented to the user in a continuous stream, the video segments are preferably arranged into multiple channels, as shown in FIG. 1, such that the user may switch between various channels, such as by clicking or selecting a channel or video segment. Throughout the progression of a multi-channel video, the channel options and video segments played in the active stream preferably changes based on the alignment of video segments, progression through a timeline, and user selection of channel options. A play list (e.g., a set list from a concert) or other metadata related to the video stream may also be presented to the user alongside the video stream. Switching between the channels may have the effect of switching the active stream to different video perspectives captured by different event participants. Step S220 of a preferred embodiment preferably additionally includes the sub-steps of playing the first video segment in an active stream S230, progressing a timeline of the multi-channel video when video is played in the active stream S240, displaying the second video segment as a selectable video channel when the timeline progresses to a synchronized time of the second video segment S250, and playing the second video segment in the active stream and synchronized to the timeline S260.

Step S230, which includes rendering the multi-channel video further comprising playing the first video segment in an active stream, functions to play an initial video segment in a main frame of the player interface. The active stream is preferably defined by video and/or audio content prominently presented. As shown in FIG. 1, the active stream is played in a frame at least twice the display area as a frame of a channel option. Additionally, the audio of the video segment played in the active stream may be audibly featured. The audio of the video in the active stream may be the only played audio or it may receive increased volume settings compared to other video segments. In some variations, a master audio track is played through out the rendering of the multi-channel video, and the video stream playing in the active stream may be mixed with the master audio track. The video content is preferably presented to the user in a continuous active stream without any significant interruptions from the user perspective. In one preferred embodiment, however, the stream is actually sourced from a first source for the first video segment and a second source for the second video segment. In other words, the video content is preferably kept in separate files on a server of the multi-channel video service or video host, and the video segments are accessed in a manner that facilitates continuous streaming/playing from the user perspective. The step may include streaming the video segment from the first source, switching during a bridge event, and then streaming the video segment from the second source. In the background, the step may include pre-buffering the video segment from the second source while streaming the video segment from the first source to facilitate a smoother transition. In an alternative embodiment, video segment media is stored within the multi-channel video file, and the video segment is played from the data of the file.

Step S240, which includes progressing a timeline of the multi-channel video when video is played in the active stream, functions to track the temporal alignment of video segments. The timeline is preferably the unified timeline of the combination of aligned video segments. Put another way, the multi-channel video is the combination of multiple video segment options that are aligned along a timeline, and video segments may be selectively played according to the progression through that timeline. Channel options are preferably only available when a video segment includes content mapped to the current playback position of the timeline. The timeline may be a programmatic construct used internally in rendering of a multi-channel video, but the timeline may additionally be a user interface element. The timeline may be graphically displayed as a progress bar in the player interface. In one variation, the timeline may facilitate browsing of available channel options at different points in the timeline. For example, hovering a mouse over a point in the timeline may display an informational popup communicating the number of channel options at that point in the timeline. Receiving user selection of a portion of a timeline may additionally transition rendering of the multi-channel video file to the selected portion of the timeline. Progression of the timeline is additionally synchronized with the playing of video in the active stream and/or video in channel options. For example, if the first video segment pauses to buffer video content, the timeline of the multi-channel video preferably pauses progression.

Step S250, which includes displaying the second video segment as a selectable video channel when the timeline progresses to a synchronized time of the second video segment, functions to communicate video segment options during playback of the multi-channel video. The channels preferably reflect, in real-time, the available video segments for the current position in the timeline. For example, a multi-channel video may capture an event from time 0:00 to 0:10. A first video segment may capture from 0:00 to 0:07 and a second video segment may capture the 0:05 to 0:10 portions of the event. When the timeline progressed to 0:05, a selectable video channel of the second video segment is preferably displayed. Any suitable number of channels may be displayed at any one time. A video channel is preferably not selectable and/or displayed when playback position in the timeline is at a position that does not correspond to the synchronized alignment of a video segment of the channel. For example, the video channel of the second video segment is preferably not displayed when the playback position is in the 0:00 to 0:04 range of the timeline. Such channel display conditions are preferably applied to all video channels of the multi-channel video.

Video channels are preferably represented by at least a graphical thumbnail (i.e., size reduced graphic) from a video segment of the video channel. More preferably, the graphical thumbnail is a video thumbnail that plays concurrently with the video of the active stream, and the video is synchronized to the timeline and with the video playing in the active stream.

In application, a user will be able to see multiple visual videos at the same time, at least one will be a main active video (typically larger in size) and smaller video visuals will be displayed smaller. The audio from video thumbnails is preferably muted or alternatively has reduced volume.

A video channel is any suitable categorization of video segments. Video channels may correspond to a single video segment, but in alternative embodiments, the video channels correspond to a collection of multiple video segments. Video channels of a collection of multiple video segments can simplify user selection of a preferred channel. For example, if a user selects a channel for video segments taken by a particular participant, the video player may be configured to automatically play video segments from that channel when that video channel is available in the timeline. The video channels can be organized around any suitable video segment categorization. In another preferred embodiment, the video channels are displayed as a list of selectable options. In another preferred embodiment, the video channels are displayed as selectable options in a map, where the selectable options are graphically positioned on a map substantially near the representational location of where a video segment was captured. In another preferred embodiment, each video channel consolidates video segments captured by an individual participant, geographic location, or content. In another preferred embodiment, the video channels are graphically organized according to ranking such as number of views, number of social promotions (e.g., likes, shares, ratings, etc.). These channels are preferably ordered according to any of: the number of views or likes of a video segment, such as on YouTube or Facebook; the quality of the visual portion of the video segment; the quality of the audio portion of the video segment; or according to any other factor.

Step S260, which includes and playing the second video segment in the active stream and synchronized to the timeline, functions to change the active stream to play the second video segment in place of the first video segment. The second video segment will preferably play in the active stream upon being triggered. The second video segment may be preliminarily loaded to avoid buffering or initialization delays when playing a video segment. Any video segment may be loaded in advance to display in a video channel or in the active stream. If the first video segment still has content that corresponds to the current progress position of the timeline, then the first video segment may be displayed within a selectable video channel. The user may optionally change the active stream to any video channel available during the current position of the timeline. The second video segment may be triggered through the detection of a number of events.

Figure 15A:
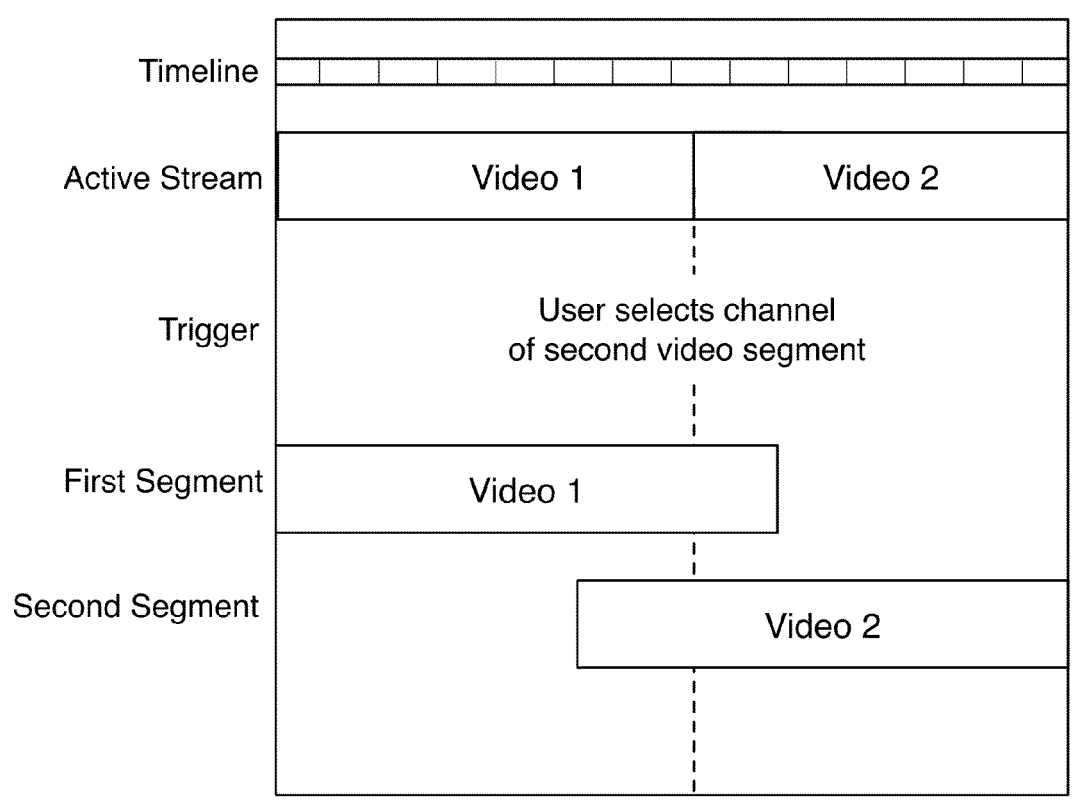
FIGS. 15A-D are schematic timeline representations of video segment transitions of an active video stream.
Figure 15B:
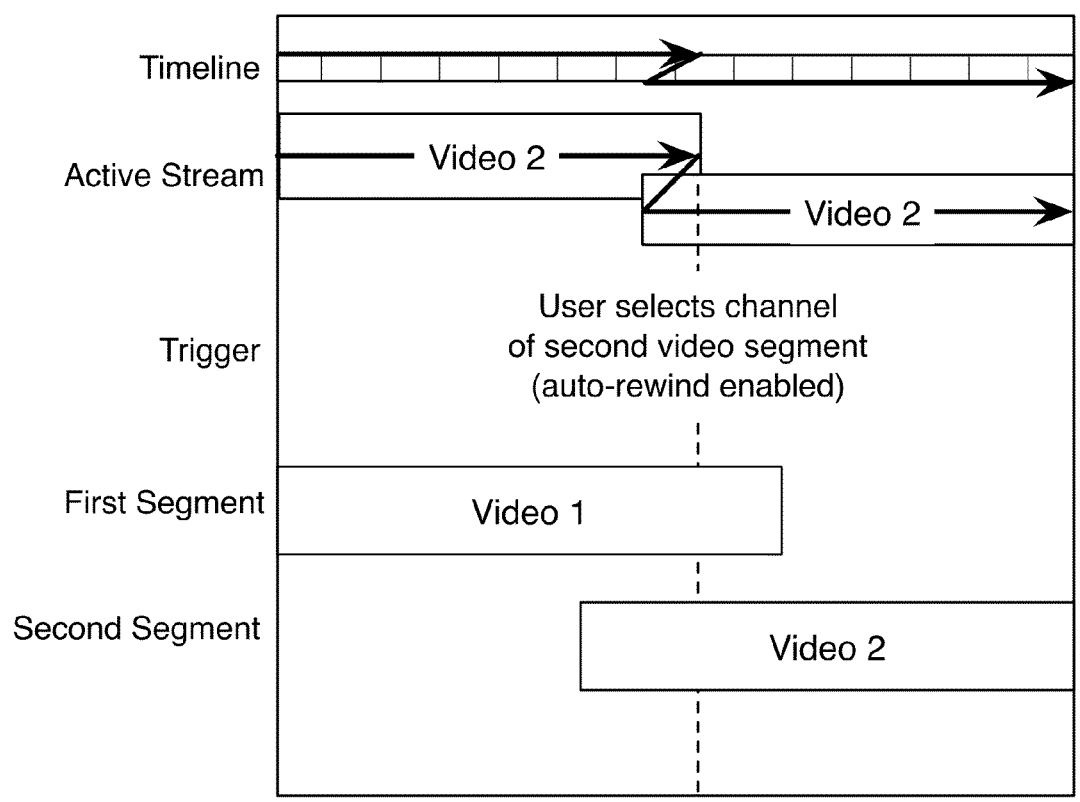

In one variation shown in FIG. 15A, the second video segment will play upon receiving user selection of the video channel option of the second video segment. The video channel options, as described above, are preferably user input elements such as a user interface button. When a user clicks, touches, or otherwise selects the video channel of the second video segment, the first video segment playing in the active stream will be changed to the second video segment. In some variations, receiving user selection may selectively result in shifting the timeline progress as shown in FIG. 15B. The shifting of timeline progress is typically used in performing an instant replay upon video channel selection. If the user selection is received when the second video segment includes sufficient video content prior to the current timeline position and the player interface is configured for instant replay, the player interface will revert the timeline progress by a marginal amount of time. The second video segment will then start playing at a point synchronized to the timeline prior to the previous position. The marginal amount of time may be less than 30 seconds, 10 seconds, 5 seconds, automatically determined, and/or any suitable amount of time. For example, in a multi-channel video of a sporting event, a user may see a particular play and want to see that play performed from a different perspective. The user can select a second video channel after the play is completed, and the second video segment will play starting at a point towards the beginning of the play (e.g., 10 seconds ago).

Figure 15C:
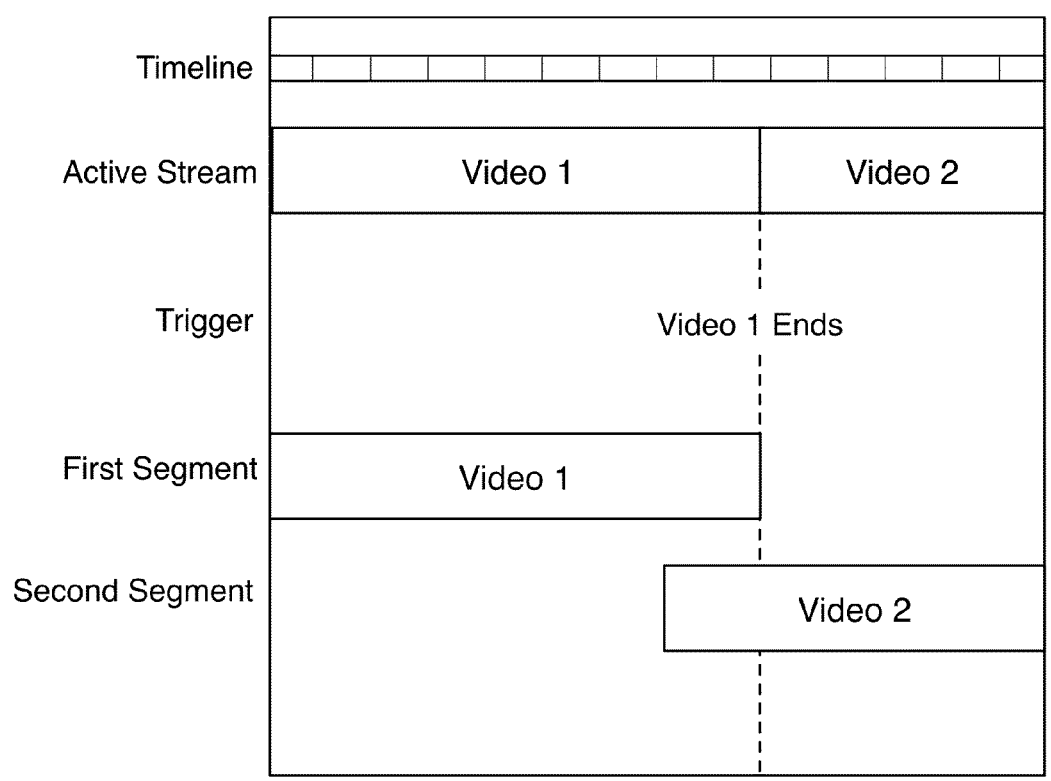

In another variation shown in FIG. 15C, the second video segment will play upon the first video segment ending. After a current video segment (e.g., the first video segment) ends, the player interface preferably plays a video segment from available video channel options. If there are no video segments that are synchronized to the point in the timeline directly after the conclusion of the first video segment, then the player preferably selects a subsequent video segment. If there are no more video segments, then the player is at the end of the multi-channel video, and the stream ends.

Figure 15D:
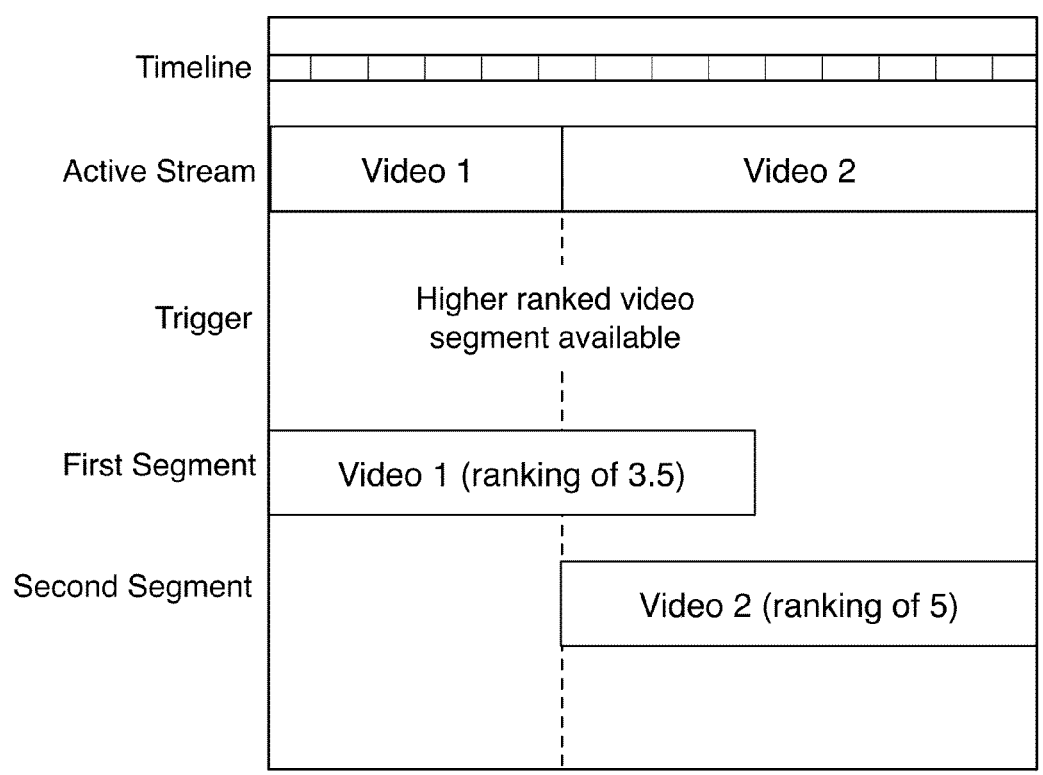

In another variation shown in FIG. 15D, the second video segment will play upon automatically selecting the second channel. The active stream will preferably change video segments according to rankings of available video channels. Video segments and/or video channels may have an associated rank which may be based on number of views, social promotions (e.g., likes, shares, favorites), rating, video quality, participant ranking, social network relationship to participant, and/or any suitable factors to rank video segments. In some variations, user selection of a channel counts towards the rank of a video segment. Thus, a channel that is watched more will preferably have a ranking increased as compared to video channel that was not selected. Preferably, the video segment with the highest rank at a given position in the timeline will be played in the active stream. Using the example above, if the second video segment is more popular, then the first video segment will be played in the active video stream for 0:00 to 0:05, and then the active stream will play the more popular second segment from 0:05 to 0:10. On the other hand, if the first video segment has a higher ranking, the first video segment will play in its entirety from 0:00 to 0:07, and then the second video segment will play from 0:07 to 0:10. Automatic selection may alternatively be based on user preferences or player history. For example, the player may remember previously selected video channels, when video segments of that selected video channel are available, the active stream may use the video segment of that channel over other video channel options.

Figure 16:
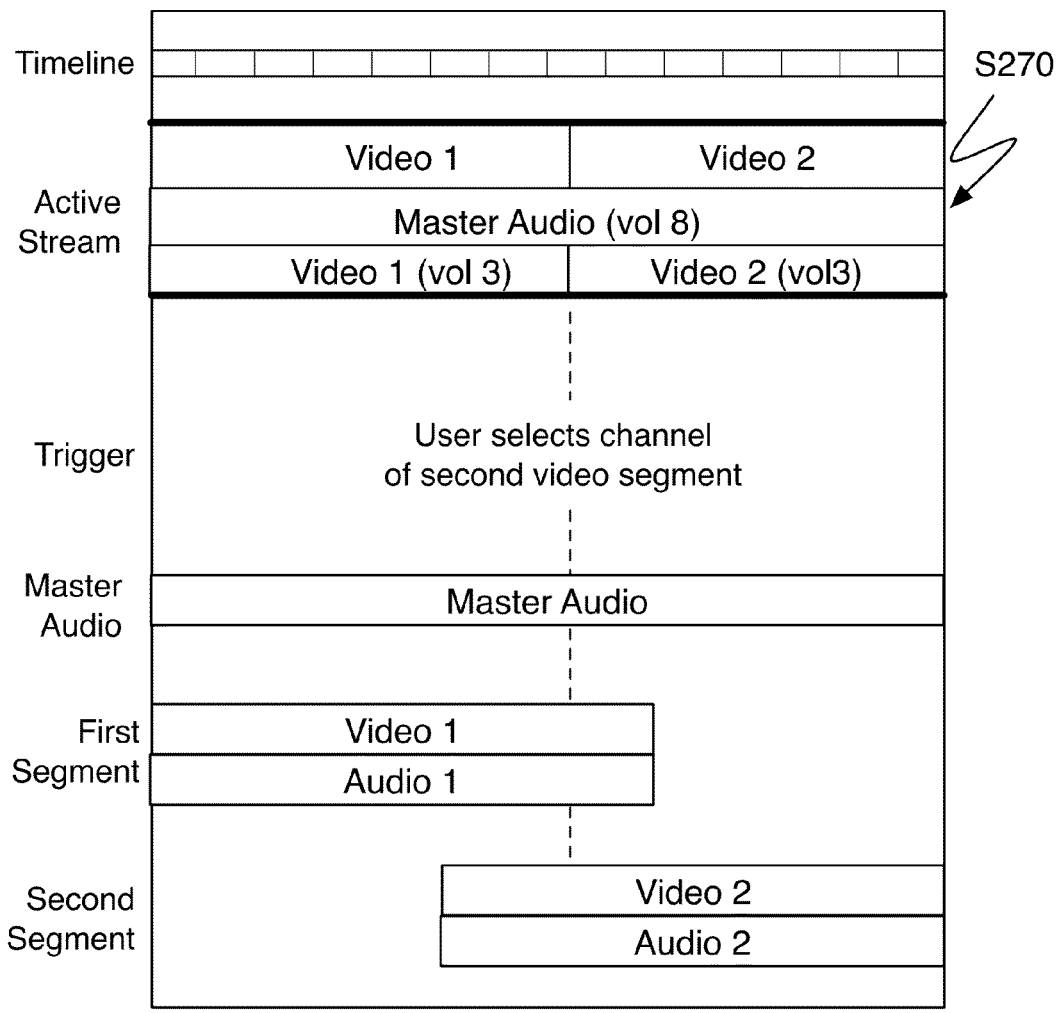
FIG. 16 is a schematic timeline representation of mixing audio of the multi-channel video.

Additionally, as shown in FIG. 16, the method of a preferred embodiment may include mixing audio of the video segments S270, which functions to combine at least one audio track of a video segment with a second audio track during progression of the multi-channel video timeline. In many situations, the video segments are of the same event, and there will typically be at least some portion of a video segment's audio signal that is shared with other video segments, such as the music played at a concert. In some variations, an audio track may be designated as the main audio track. In the case of a music concert, the professionally recorded audio from the performance may be added as audio only media, and that audio is played as the main audio track. The audio of video segments can be superimposed with the main audio track to provide ambient noise of the perspective of the video segment.

The method of the preferred embodiment may further include adjusting the video stream, which functions to implement changes requested by a user, to the multi-channel video. The user is preferably permitted to "curate" the video stream or, in other words, to customize and personalize the video stream. The user may: rearrange video segments, such as if video segments are improperly ordered or aligned; add or insert video segments missed in the previous steps; delete video segments that are unrelated to the event or should not be included in the multi-channel video; reorder the channels; add or adjust a set or play list; adjust volume, contrast, brightness, or other audio or visual levels of one of more video segments; adjust the threshold correlation coefficient to permit or remove additional video segments; or perform any other customization of the video stream. The user may also provide a preference as to a default video segment, secondary video segment, tertiary video segment, etc., by rearranging the channels or rearranging video segments across channels. User curation of the video stream preferably occurs through a user interface. In one alternative embodiment, the adjustment may be facilitated through the player interface. A plurality of viewers may contribute to voting for adjustments to the multi-channel video. In another alternative embodiment, the adjustment of the video stream occurs during the assembling of a multi-channel video file. In this variation, the user interface may be a user interface through which the search term is captured or the event defined. The adjustment user interface is preferably provided through a web browser, an app (e.g., on a smartphone or tablet), or computer software.

In the variation in which the user adds or deletes video segments, the multi-channel video may be at least partially reprocessed as in the method for compiling video segments described above. A threshold correlation coefficient is preferably modified to correspond to the change(s) made by the user. In particular, if a video segment was improperly included because the threshold correlation coefficient was too low, the threshold correlation coefficient should be raised to suit; if a video segment was improperly missed because the threshold correlation coefficient was too high, the threshold correlation coefficient should be lowered to suit; in either case, additional video segments may either be added or deleted from the video stream automatically based upon a single user input to add or delete a video segment. Thus, user preferences or inputs may be fed back into the 'machine' in order to retroactively modify the steps of selecting, fingerprinting, and compiling video segments. However, the user may make any other adjustments to the video stream, and user curation may affect the video stream, or creation thereof, in any other way.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the multi-channel service system and/or participant application(s). The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various components and steps of the multi-channel video system and method.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
    retrieving a multi-channel video file with at least a first video segment and a second video segment
    correlating an identifier of each of the first video segment and the second video segment by comparing correlation coefficients having a peak correlation coefficient and a threshold correlation coefficient, wherein the peak correlation coefficient greater than the threshold correlation coefficient substantially proves a relationship between the first video segment and the second video segment;
    assigning a quantitative rank to at least the first video segment and the second video segment; and
    rendering at least the first video segment and the second video segment in a player interface synchronized to a timeline of the multi-channel video file, rendering step further comprising:
        playing the first video segment in an active stream,
        progressing the timeline of the multi-channel video file when video is played in the active stream,
        when the timeline progresses to a synchronized time of the second video segment and the quantitative rank of the second video segment is greater than the quantitative rank of the first video segment, playing the second video segment in the active stream and displaying the first video segment as a selectable video channel, and
        when the timeline progresses to a synchronized time of the second video segment and the quantitative rank of the second video segment is less than the quantitative rank of the first video segment, displaying the second video segment as a selectable video channel.

2. The method of claim 1, wherein upon receiving user interface selection of the selectable video channel, playing the video segment displayed as the selectable video channel in the active stream.

3. The method of claim 2, further comprising upon receiving user interface selection of the selectable video channel, reverting the timeline to a position prior to the position when the video channel is selected.

4. The method of claim 1, wherein assigning a quantitative rank to the at least the first video segment and the second video segment further comprises assigning the quantitative rank by social promotions of a user from a social media site.

5. The method of claim 1, wherein assigning a quantitative rank to the at least the first video segment and the second video segment further comprises assigning the quantitative rank by number of views of the video segment.

6. The method of claim 1, wherein upon progressing timeline to the end of the first video segment, playing the second video segment in the active stream.

7. The method of claim 1, further comprising streaming the first and second video segments from a remote server.

8. The method of claim 7, wherein streaming the first and second video segments includes loading the stream of the second video segment prior to playing the second video segment.

9. The method of claim 1, wherein the first and second video segments are played from data in the multi-channel video file.

10. The method of claim 1, wherein displaying the second video segment as the selectable video channel further comprises displaying the second video segment as the selectable video channel represented in the player interface as a graphic representation of a video segment reduced in size.

11. The method of claim 10, wherein displaying the second video segment as the selectable video channel represented in the player interface as a graphic representation of the video segment reduced in size, further comprises playing the video segment reduced in size.

12. The method of claim 10, wherein the graphic representation of the video segment reduced in size is a marker positioned on a representational map and the position of the marker substantially corresponds to a geographic location associated with the video segments of the video channel.

13. The method of claim 10, wherein progressing the timeline comprises representing the timeline as a progress bar that upon user selection of a position of the timeline, displays a number of video segments synchronized to that position.

14. The method of claim 1, further comprising playing a main audio track throughout the timeline progression of the multi-channel video file; and combining audio of a video played in the active stream with the main audio track.

15. The method of claim 1, further comprising receiving user augmentation to the multi-channel video file.

16. The method of claim 15, wherein receiving user augmentation to the multi-channel video file includes adjusting the synchronization of a video segment based on user input.

17. The method of claim 15, wherein receiving user augmentation to the multi-channel video file includes adding a new video segment to the multi-channel video file, and synchronizing the new video segment to the timeline.

18. A method comprising:
retrieving a multi-channel video file with at least a first video segment and a second video segment
correlating an identifier of each of the first video segment and the second video segment by comparing correlation coefficients having a peak correlation coefficient and a threshold correlation coefficient, wherein the peak correlation coefficient greater than the threshold correlation coefficient substantially proves a relationship between the first video segment and the second video segment;
assigning a quantitative rank to at least the first video segment and the second video segment based on history of the first video segment and the second video segment; and
rendering at least the first video segment and the second video segment in a player interface, synchronized to a timeline of the multi-channel video file, the rendering step further comprising:
playing the first video segment in an active stream,
progressing the timeline of the multi-channel video file when video is played in the active stream,
upon progressing the timeline to a synchronized time of the second video segment and the second video segment having a quantitative rank greater than a quantitative rank of the first video segment, playing the second video segment in the active stream and displaying the first video segment as a selectable video channel,
upon progressing the timeline to the synchronized time of the second video segment and the second video segment having a quantitative rank less than the quantitative rank of the first video segment, displaying the second video segment as a selectable video channel,
upon selectively receiving user interface selection of the selectable video channel, displaying the video segment playing in the active stream as a selectable video channel and playing the video segment of the selectable video channel in the active stream, and
upon progressing the timeline to the end of video segment played in the active stream, playing a second video segment from a selectable video channel in the active stream.

19. The method of claim 18, further comprising streaming the first video segment for a first video resource of a remote server and streaming the second video segment from a second video resource of the remote server.

20. The method of claim 19, wherein displaying the second video segment as a selectable video channel further comprises playing video of the second video segment in the selectable video channel synchronized to the timeline.

\* \* \* \* \*